(12) United States Patent
Furuta

(10) Patent No.: US 10,397,437 B2
(45) Date of Patent: Aug. 27, 2019

(54) IMAGE FORMING APPARATUS

(71) Applicant: CANON KABUSHIKI KAISHA, Tokyo (JP)

(72) Inventor: Yasutomo Furuta, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/461,206

(22) Filed: Mar. 16, 2017

(65) Prior Publication Data

US 2017/0280001 A1 Sep. 28, 2017

(30) Foreign Application Priority Data

Mar. 23, 2016 (JP) ................................. 2016-058663

(51) Int. Cl.
*H04N 1/23* (2006.01)
*H04N 1/00* (2006.01)
(Continued)

(52) U.S. Cl.
CPC ......... *H04N 1/2346* (2013.01); *G03G 15/043* (2013.01); *G03G 15/04072* (2013.01); *H04N 1/00037* (2013.01); *H04N 1/00068* (2013.01); *H04N 1/00087* (2013.01); *H04N 1/00814* (2013.01); *H04N 1/06* (2013.01); *H04N 1/113* (2013.01); *H04N 1/295* (2013.01);
(Continued)

(58) Field of Classification Search
CPC ... H04N 1/00814; H04N 1/113; H04N 1/2346
See application file for complete search history.

(56) References Cited

U.S. PATENT DOCUMENTS 6,459,520 B1 * 10/2002 Takayama ................ B41J 2/471
359/204.1
6,657,650 B1 * 12/2003 Omelchenko ...... G06K 15/1219
347/234
(Continued)

FOREIGN PATENT DOCUMENTS

JP 2004-271691 9/2004

OTHER PUBLICATIONS

U.S. Appl. No. 15/466,582, filed Mar. 22, 2017.
U.S. Appl. No. 15/462,532, filed Mar. 17, 2017.
U.S. Appl. No. 15/459,951, filed Mar. 15, 2017.

*Primary Examiner* — King Y Poon
*Assistant Examiner* — Michael Burleson
(74) *Attorney, Agent, or Firm* — Venable LLP

(57) ABSTRACT

An image forming apparatus, including: a light source including a plurality of light emitting points and configured to emit light beams; a photosensitive member configured to rotate in a rotation direction so that a latent image is formed thereon with the light beams; a rotary polygon mirror configured to rotate around a rotation axis and having a plurality of mirror faces each configured to deflect the light beams so that the photosensitive member is scanned with the light beams; a detector configured to detect temperature; and a correction unit configured to correct image data of an input image by using a deviation amount, in the rotation direction of the photosensitive member, of the light beams deflected by each of the plurality of mirror faces, wherein the correction unit obtains the deviation amount according to the temperature detected by the detector.

17 Claims, 18 Drawing Sheets

(51) Int. Cl.
*H04N 1/113* (2006.01)
*H04N 1/06* (2006.01)
*H04N 1/29* (2006.01)
*H04N 1/50* (2006.01)
*G03G 15/04* (2006.01)
*H04N 1/409* (2006.01)
*G03G 15/043* (2006.01)

(52) U.S. Cl.
CPC ............ *H04N 1/409* (2013.01); *H04N 1/506* (2013.01); *G03G 2215/0129* (2013.01); *H04N 2201/0082* (2013.01)

(56) References Cited

U.S. PATENT DOCUMENTS

| | | | |
|---|---|---|---|
| 7,403,316 B2* | 7/2008 | Amada | G02B 26/123 359/204.1 |
| 8,506,086 B2* | 8/2013 | Diegel | H04N 1/6052 345/590 |
| 8,917,305 B2 | 12/2014 | Nakahata et al. | 347/244 |
| 9,261,809 B2 | 2/2016 | Furuta | G03G 15/043 |
| 9,860,422 B2* | 1/2018 | Horiuchi | H04N 1/4052 |
| 2016/0147170 A1 | 5/2016 | Furuta | G03G 15/04072 |
| 2017/0019560 A1 | 1/2017 | Horiuchi et al. | H04N 1/113 |
| 2017/0019561 A1 | 1/2017 | Furuta | H04N 1/4052 |
| 2017/0019562 A1 | 1/2017 | Furuta et al. | G03G 15/043 |
| 2017/0019563 A1 | 1/2017 | Araki | H04N 1/06 |
| 2017/0019564 A1 | 1/2017 | Horiuchi | H04N 2201/0094 |
| 2017/0038703 A1 | 2/2017 | Horiuchi et al. | H04N 2201/0094 |
| 2017/0041489 A1 | 2/2017 | Furuta | H04N 2201/0094 |

* cited by examiner

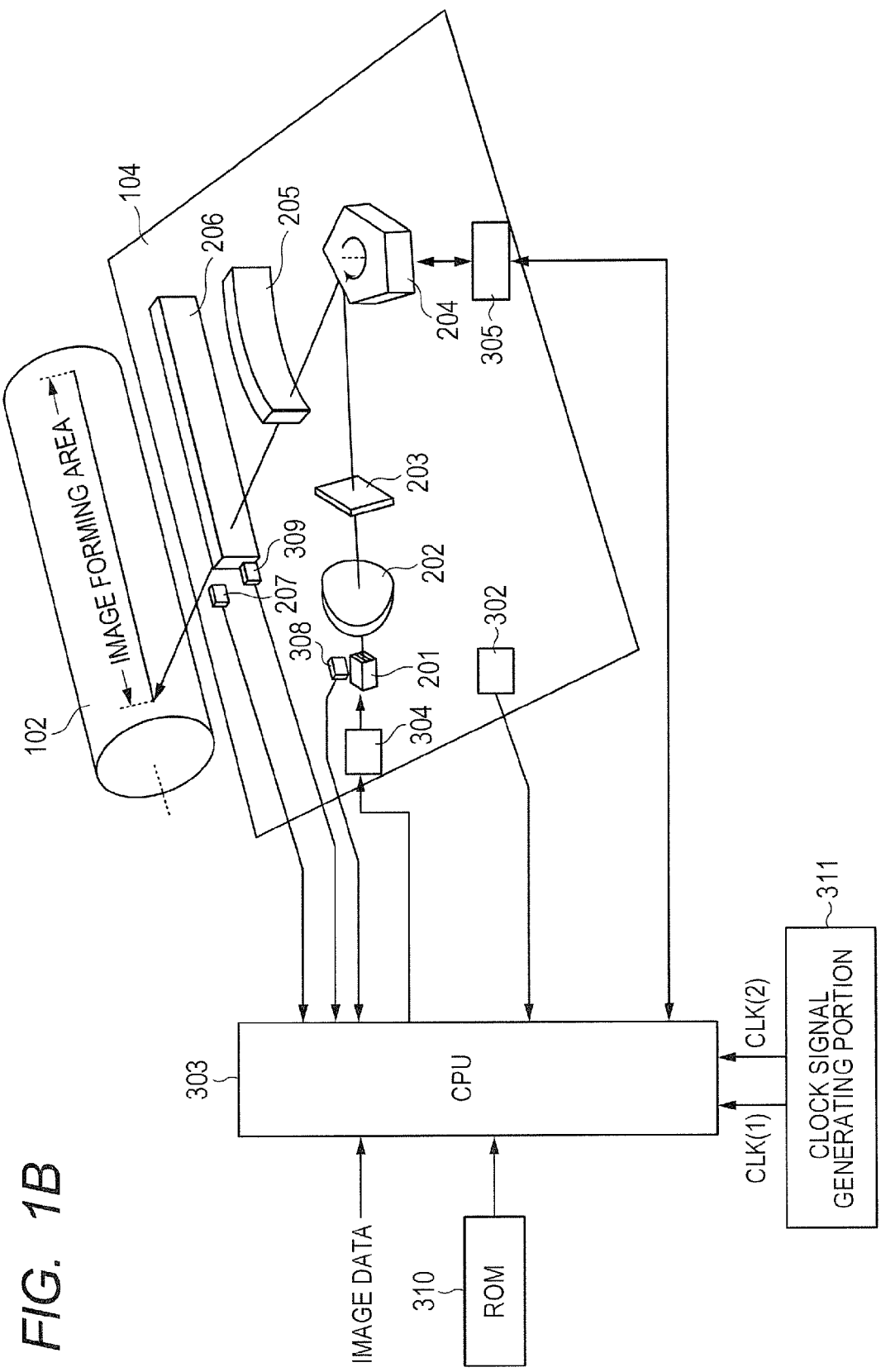

| FACE NUMBER | OPTICAL FACE TANGLE ERROR | MIRROR FACE ECCENTRIC AMOUNT |
|---|---|---|
| 1 | X1 | Y1 |
| 2 | X2 | Y2 |
| 3 | X3 | Y3 |
| 4 | X4 | Y4 |
| 5 | X5 | Y5 |

SCANNING POSITIONS ARE SHIFTED IN ADVANCE DIRECTION

SCANNING POSITIONS ARE SHIFTED IN RETURN DIRECTION

SCANNING POSITIONS ARE DENSE

SCANNING POSITIONS ARE SPARSE

SCANNING POSITIONS ARE SHIFTED IN ADVANCE DIRECTION

SCANNING POSITIONS ARE SHIFTED IN RETURN DIRECTION

SCANNING POSITIONS ARE DENSE

SCANNING POSITIONS ARE SPARSE

FIG. 14A

| TEMPERATURE CHANGE AMOUNT ΔT1 OF LASER ELEMENT | CORRECTION COEFFICIENT K3 (ΔT1) |
|---|---|
| 0 | CORRECTION COEFFICIENT K3 (0) |
| 5 | CORRECTION COEFFICIENT K3 (5) |
| 10 | CORRECTION COEFFICIENT K3 (10) |
| 15 | CORRECTION COEFFICIENT K3 (15) |
| 20 | CORRECTION COEFFICIENT K3 (20) |
| 25 | CORRECTION COEFFICIENT K3 (25) |
| 30 | CORRECTION COEFFICIENT K3 (30) |

FIG. 14B

| TEMPERATURE CHANGE AMOUNT ΔT2 OF LENS | CORRECTION COEFFICIENT K4 (ΔT2) |
|---|---|
| 0 | CORRECTION COEFFICIENT K4 (0) |
| 5 | CORRECTION COEFFICIENT K4 (5) |
| 10 | CORRECTION COEFFICIENT K4 (10) |
| 15 | CORRECTION COEFFICIENT K4 (15) |
| 20 | CORRECTION COEFFICIENT K4 (20) |
| 25 | CORRECTION COEFFICIENT K4 (25) |
| 30 | CORRECTION COEFFICIENT K4 (30) |

FIG. 17

|      | 0 | 1 | 2 | 3 | 4 | 5 | 6 | 7 | 8 | 9 | 10 | 11 | 12 | 13 | 14 | 15 |
|------|---|---|---|---|---|---|---|---|---|---|----|----|----|----|----|----|
| 0000 | 0 | 0 | 0 | 0 | 0 | 0 | 0 | 0 | 0 | 0 | 0  | 0  | 0  | 0  | 0  | 0  |
| 0001 | 0 | 0 | 0 | 0 | 0 | 0 | 0 | 0 | 0 | 0 | 0  | 0  | 0  | 0  | 1  | 1  |
| 0010 | 0 | 0 | 0 | 0 | 0 | 0 | 0 | 0 | 0 | 0 | 0  | 0  | 0  | 1  | 1  | 1  |
| 0011 | 0 | 0 | 0 | 0 | 0 | 0 | 0 | 0 | 0 | 0 | 0  | 0  | 1  | 1  | 1  | 1  |
| 0100 | 0 | 0 | 0 | 0 | 0 | 0 | 0 | 0 | 0 | 0 | 0  | 1  | 1  | 1  | 1  | 1  |
| 0101 | 0 | 0 | 0 | 0 | 0 | 0 | 0 | 0 | 0 | 0 | 1  | 1  | 1  | 1  | 1  | 1  |
| 0110 | 0 | 0 | 0 | 0 | 0 | 0 | 0 | 0 | 0 | 1 | 1  | 1  | 1  | 1  | 1  | 1  |
| 0111 | 0 | 0 | 0 | 0 | 0 | 0 | 0 | 0 | 1 | 1 | 1  | 1  | 1  | 1  | 1  | 1  |
| 1000 | 0 | 0 | 0 | 0 | 0 | 0 | 0 | 1 | 1 | 1 | 1  | 1  | 1  | 1  | 1  | 1  |
| 1001 | 0 | 0 | 0 | 0 | 0 | 0 | 1 | 1 | 1 | 1 | 1  | 1  | 1  | 1  | 1  | 1  |
| 1010 | 0 | 0 | 0 | 0 | 0 | 1 | 1 | 1 | 1 | 1 | 1  | 1  | 1  | 1  | 1  | 1  |
| 1011 | 0 | 0 | 0 | 0 | 1 | 1 | 1 | 1 | 1 | 1 | 1  | 1  | 1  | 1  | 1  | 1  |
| 1100 | 0 | 0 | 0 | 1 | 1 | 1 | 1 | 1 | 1 | 1 | 1  | 1  | 1  | 1  | 1  | 1  |
| 1101 | 0 | 0 | 1 | 1 | 1 | 1 | 1 | 1 | 1 | 1 | 1  | 1  | 1  | 1  | 1  | 1  |
| 1110 | 0 | 1 | 1 | 1 | 1 | 1 | 1 | 1 | 1 | 1 | 1  | 1  | 1  | 1  | 1  | 1  |
| 1111 | 1 | 1 | 1 | 1 | 1 | 1 | 1 | 1 | 1 | 1 | 1  | 1  | 1  | 1  | 1  | 1  |

IMAGE FORMING APPARATUS

BACKGROUND OF THE INVENTION

Field of the Invention

The present invention relates to an image forming apparatus, for example, a digital copying machine, a multifunctional peripheral, or a laser printer, which is configured to correct distortion and uneven image density of an image during image formation of a two-dimensional image by the image forming apparatus.

Description of the Related Art

In electrophotographic image forming apparatus such as a laser printer and a copying machine, there has been generally known a system in which a latent image is formed on a photosensitive member with use of a light scanning device configured to perform scanning with a laser beam. The light scanning device of a laser scanning type employs a scanning exposure system in which a laser beam collimated with use of a collimator lens is deflected by a rotary polygon mirror, and the deflected laser beam is formed into an image on a photosensitive member with use of an elongated fθ lens. In such a scanning exposure system, scanning timing of a light beam for scanning with the rotary polygon mirror is detected by a light detector (hereinafter referred to as "BD"), and writing timing of an image is controlled such that the image is written at a predetermined position on the photosensitive member. Through the scanning timing detection by the BD, the writing timing on the photosensitive member can be controlled based on the rotation speed and phase of the rotary polygon mirror.

However, the system configured to control the writing timing by the BD has a problem in that, due to an incorrect angle of mirror faces (reflecting faces) of the rotary polygon mirror or incorrect flatness of the mirror faces, printing positions in an image area differ between the respective mirror faces (this is referred to as an optical face tangle error of the rotary polygon mirror). Such positional deviation due to a tolerance of the mirror faces of the rotary polygon mirror repeatedly occurs every time the rotary polygon mirror rotates once, leading to periodic uneven image density. In order to solve the problem, for example, in Japanese Patent Application Laid-Open No. 2004-271691, there is disclosed a system configured to store a difference in scanning start positions between the respective mirror faces of a rotary polygon mirror to control emission timing.

In image forming apparatus as represented by laser printers, a relationship of a density control amount to a light amount changes when the image forming apparatus degrades due to a change in temperature environment or use. Thus, it is difficult to stably correct banding with use of a method such as the one in Japanese Patent Application Laid-Open No. 2004-271691 described above, which adjusts a density by adjusting an exposure amount because the density control amount tends to change. In addition, when positional deviation occurs for a relatively long period in a color image forming apparatus, positional deviation occurs between the colors of toners for a long period, leading to image defects including uneven hue. FIG. 15 is a diagram for illustrating positional deviation of each of scanning lines. A positional deviation amount in an image area between an ideal position of a scanning line and an actual scanning position varies in a non-uniform manner due to factors including fluctuation in surface speed of a photosensitive drum. A related-art image forming apparatus is not capable of moving an image position, and hence there is a problem in that uneven hue is not reduced.

In addition, there is a problem in that, when a temperature environment around the printer changes, the deviation amount of the scanning position of a light beam for scanning the photosensitive member changes. FIG. 16A is a diagram for illustrating scanning positions for each face of the rotary polygon mirror before and after a rise in temperature. As illustrated in FIG. 16A, there is a problem in that, even when the photosensitive member is positioned so as to match with a conjugate point in an initial state (e.g., adjustment at a factory), the conjugate point moves due to the rise in temperature to cause the positional deviation.

SUMMARY OF THE INVENTION

The present invention has been made under the above-mentioned circumstances, and it is an object of the present invention to achieve high image quality without uneven image density by correcting positional deviation between the respective mirror faces of a rotary polygon mirror, which is caused due to a rise in temperature in an apparatus.

In order to solve the above-mentioned problems, according to one embodiment of the present invention, there is provided an image forming apparatus, comprising:

a light source, which includes a plurality of light emitting points, and is configured to emit a light beams;

a photosensitive member configured to rotate in a rotation direction so that a latent image is formed on the photosensitive member with the light beams emitted from the light source;

a rotary polygon mirror, which is configured to rotate around a rotation axis, and has a plurality of mirror faces each configured to deflect the light beams emitted from the light source so that the photosensitive member is scanned with the light beams;

a detector configured to detect temperature; and a correction unit configured to correct image data of an input image by using a deviation amount, in the rotation direction of the photosensitive member, of the light beams deflected by each of the plurality of mirror faces, wherein the correction unit obtains the deviation amount according to the temperature detected by the detector.

Further features of the present invention will become apparent from the following description of exemplary embodiments with reference to the attached drawings.

BRIEF DESCRIPTION OF THE DRAWINGS

FIG. 1B is a view for illustrating a configuration of the periphery of a photosensitive drum and a light scanning device.

FIG. 14A and FIG. 14B are each a table of correction coefficients with respect to temperature changes.

FIG. 17 is a diagram of a conversion table for converting image data (density data) into drive data for generating a PWM signal.

DESCRIPTION OF THE EMBODIMENTS

An exemplary embodiment of the present invention will be described in detail below in an illustrative manner with reference to the accompanying drawings. A direction of an axis of rotation of a photosensitive drum, which is a direction in which scanning is performed with a laser beam, is defined as a main scanning direction that is a second direction, and a rotation direction of the photosensitive drum, which is a direction substantially orthogonal to the main scanning direction, is defined as a sub-scanning direction which is a first direction.

Figure 15:
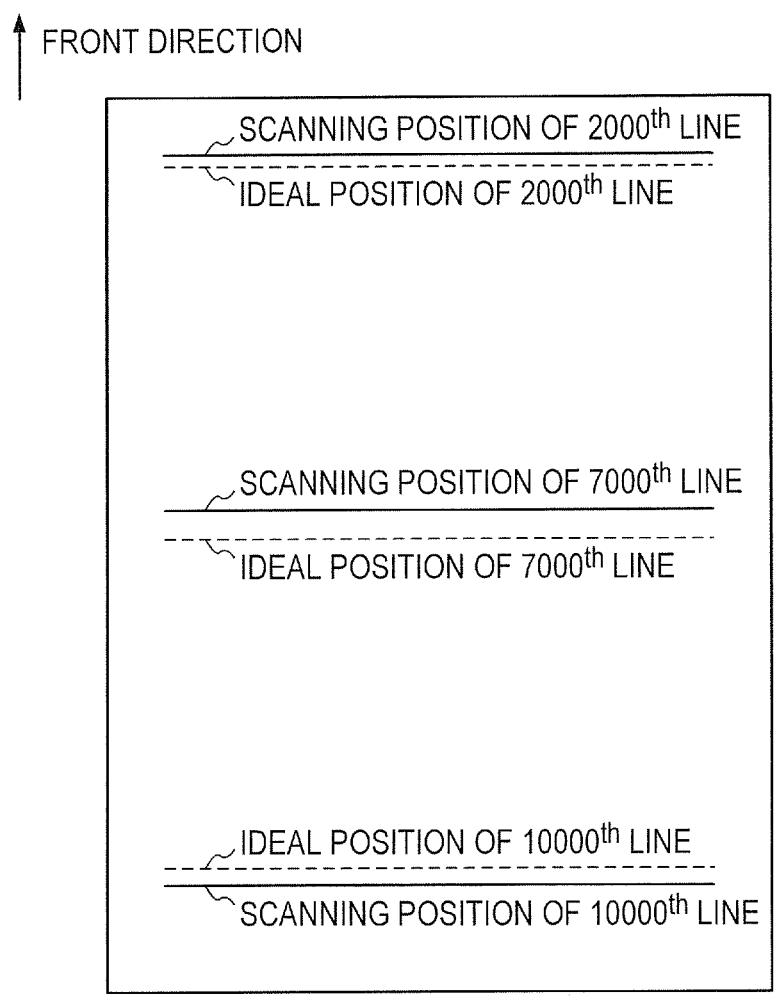
FIG. 15 is a diagram for illustrating positional deviation of scanning lines according to the related art.
Figure 16A:
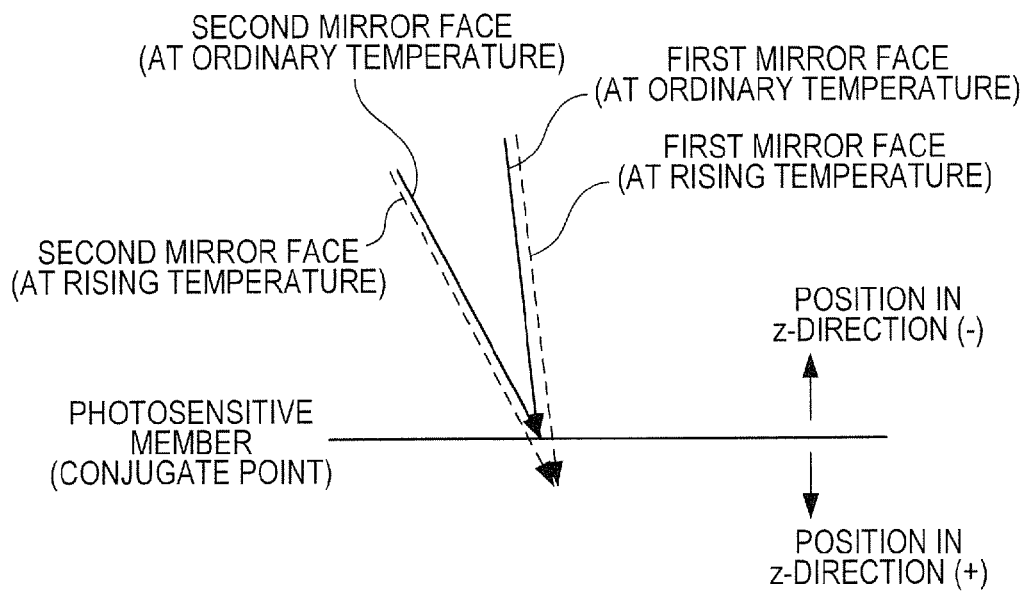
FIG. 16A is a diagram for illustrating a variation in focusing position with respect to temperature change.
Figure 16B:
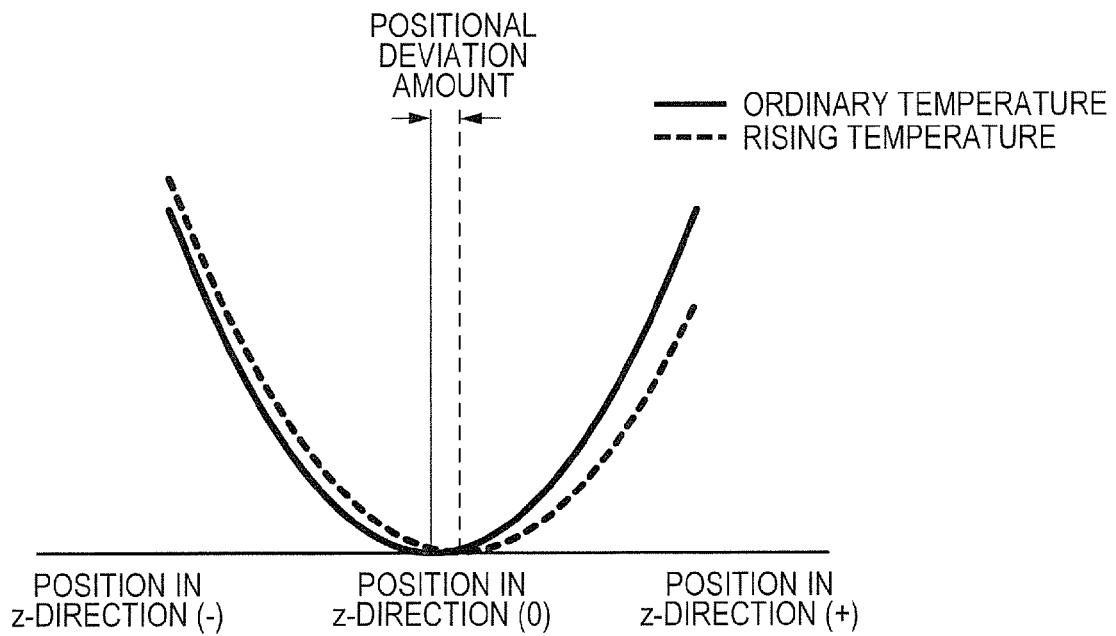
FIG. 16B is a diagram for illustrating a variation in positional deviation amount with respect to temperature change.

First, FIG. 15, FIG. 16A, and FIG. 16B, which are referred to above, are described in detail. In image forming apparatus as represented by laser printers, a relationship of a density control amount to a light amount changes when the image forming apparatus degrades due to a change in temperature environment or use. Thus, it is difficult to stably correct banding with use of a method of adjusting a density by adjusting an exposure amount because the density control amount tends to change. In addition, when positional deviation occurs for a relatively long period in a color image forming apparatus, positional deviation occurs between the colors of toners for a long period, leading to image defects including uneven hue. However, the related-art image forming apparatus is not capable of moving an image position, and hence uneven hue cannot be reduced. FIG. 15 is a diagram for illustrating positional deviation of each scanning line. About 14,000 scanning lines are formed when printing is performed on an A4 image, which has an image width of 297 mm in a longitudinal direction thereof, at a resolution of 1,200 dpi (scanning line interval: 21.16 μm).

Due to factors including a fluctuation in surface speed of a photosensitive member, a positional deviation amount between an ideal position of the scanning line and an actual scanning position in an image area varies in a non-uniform manner. In FIG. 15, in the 2,000th line and the 7,000th line from a leading edge of an image, the scanning position of a scanning line represented by the solid line deviates in a front direction of the image from an ideal position represented by the broken line, and in the 10,000th line, the scanning position deviates in a direction opposite to the front direction. When the scanning line, that is, an image position deviates from the ideal position in the image area as described above, problems including a color quality variation arise, and hence a system configured to move the absolute position of image data is required.

In addition, when a temperature environment around the printer changes, the deviation amount of the scanning position of a light beam for scanning the photosensitive member changes. The scanning position deviates due to two main factors. One of the factors is a change in refractive index of a lens due to wavelength variation, which is caused by a rise in temperature with a semiconductor laser serving as a light source. The other is a change in refractive index of a lens due to a rise in temperature, which occurs in optical systems using a plastic material for a lens. In general, in an optical system (referred to as "optical face tangle error correction optical system") configured to optically correct a scanning position for each face of a rotary polygon mirror, light beams deflected by the respective faces of the rotary polygon mirror are focused on the same position on a photosensitive member. However, when the refractive index of a condenser lens of the optical face tangle error correction optical system changes due to temperature change, the focusing position of the optical system deviates, and as a result, the focusing position of each face of the rotary polygon mirror deviates. FIG. 16A is a diagram for illustrating scanning positions for each face of the rotary polygon mirror before and after a rise in temperature. In FIG. 16A, the arrows with the solid lines indicate the optical paths of light beams deflected by a first mirror face and a second mirror face at ordinary temperature. Meanwhile, the arrows with the broken lines indicate the optical paths of light beams deflected by the first mirror face and the second mirror face at a rising temperature. The light beams at the ordinary temperature, which are indicated by the solid lines, are focused at the same position on the photosensitive drum, but the focusing positions of the light beams at the rising temperature, which are indicated by the broken lines, are not located on the photosensitive drum (z-direction (+) position in FIG. 16A).

FIG. 16B is a diagram for illustrating a difference between a position in a direction perpendicular to the photosensitive member (referred to as "z-direction") and the scanning position for each face of the rotary polygon mirror (referred to as "positional deviation amount"). Here, the term "positional deviation amount" refers to a positional difference between a mirror face having the largest deviation amount at a sub-scanning position and a mirror face having the smallest deviation amount at the sub-scanning position when the sub-scanning positions are compared. The sub-scanning position is a position at which each face of the rotary polygon mirror focuses a light beam. A z-direction position (0) indicates a position of the focusing position ideally positioned on the photosensitive member (on the surface of the photosensitive member). In FIG. 16B, the positional deviation amount is at the minimum at the position of the z-direction position (0) at the ordinary temperature (solid line). The z-direction position (0) in this case is referred to as "conjugate point". Meanwhile, at the rising temperature (broken line), the conjugate point at which the positional deviation amount is the minimum moves in a positive direction of the z-direction (z-direction position (+) in FIG. 16B). For that reason, even when the photosensitive member is positioned so as to match with the conjugate point in an initial state, for example, in adjustment in a factory, the conjugate point moves due to a rise in temperature to cause the positional deviation.

Embodiment

An image forming apparatus according to the embodiment will be described. The image forming apparatus is configured to perform uneven image density correction on uneven image density caused by a variation between the respective mirror faces of a rotary polygon mirror of a light scanning device, and to adjust a correction amount based on a change in ambient temperature or a rise in temperature in the apparatus.

[Overall Configuration of Image Forming Apparatus]

Figure 1A:
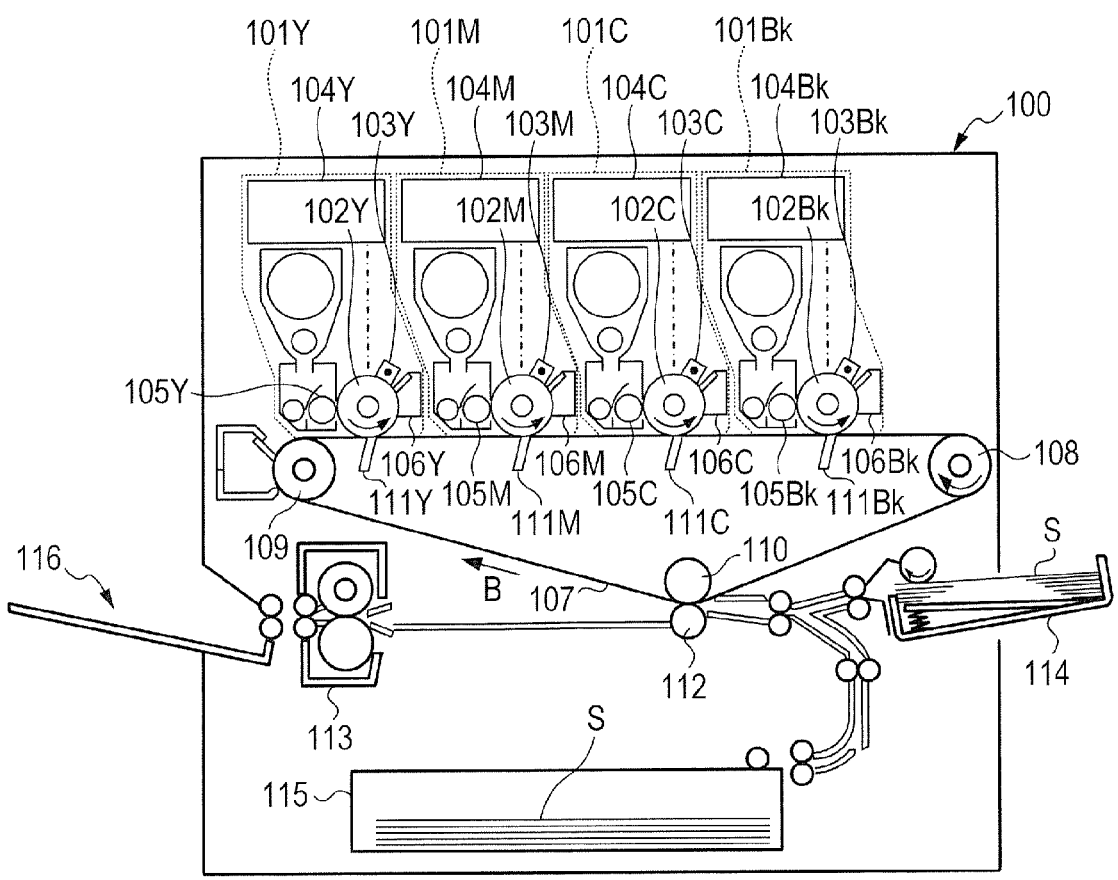
FIG. 1A is a view for illustrating an entire image forming apparatus according to an embodiment.

FIG. 1A is a schematic cross-sectional view of a digital full-color printer (color image forming apparatus) configured to perform image formation by using toners of a plurality of colors. An image forming apparatus 100 according to the embodiment will be described with reference to FIG. 1A. The image forming apparatus 100 includes four image forming portions (image forming units) 101Y, 101M, 101C, and 101Bk (broken line portions) respectively configured to form images of different colors. The image forming portions 101Y, 101M, 101C, and 101Bk form images by using toners of yellow, magenta, cyan, and black, respectively. Reference symbols Y, M, C, and Bk denote yellow, magenta, cyan, and black, respectively, and suffixes Y, M, C, and Bk are omitted in the description below unless a particular color is described.

The image forming portions 101 each include a photosensitive drum 102 that is a photosensitive member. A charging device 103, a light scanning device 104, and a developing device 105 that is a developing unit are arranged around each of the photosensitive drums 102. A cleaning device 106 is further arranged around each of the photosensitive drums 102. An intermediate transfer belt 107 of an endless belt type is arranged under the photosensitive drums 102. The intermediate transfer belt 107 is stretched around a drive roller 108 and driven rollers 109 and 110, and rotates in a direction of an arrow B (clockwise direction) illustrated in FIG. 1A during image formation. Further, primary transfer devices 111 are arranged at positions opposed to the photosensitive drums 102 across the intermediate transfer belt 107 (intermediate transfer member). The image forming apparatus 100 according to the embodiment further includes a secondary transfer device 112 configured to transfer a toner image on the intermediate transfer belt 107 onto a sheet S that is a recording medium, and a fixing device 113 configured to fix the toner image on the sheet S.

An image forming process from a charging step to a developing step of the image forming apparatus 100 will be described. The image forming process is the same in each of the image forming portions 101, and hence the image forming process will be described with reference to an example of the image forming portion 101Y. Accordingly, descriptions of the image forming processes in the image forming portions 101M, 101C, and 101Bk are omitted. The photosensitive drum 102Y that is driven to rotate in the arrow direction (counterclockwise direction) illustrated in FIG. 1A is charged by the charging device 103Y of the image forming portion 101Y. The charged photosensitive drum 102Y is exposed by a laser beam emitted from the light scanning device 104Y, which is indicated by the dashed dotted line. With this operation, an electrostatic latent image is formed on the rotating photosensitive drum 102Y (on the photosensitive member). The electrostatic latent image formed on the photosensitive drum 102Y is developed as a toner image of yellow by the developing device 105Y. The same step is performed also in the image forming portions 101M, 101C, and 101Bk.

The image forming process from a transfer step will be described. The primary transfer devices 111 applied with a transfer voltage transfer toner images of yellow, magenta, cyan, and black formed on the photosensitive drums 102 of the image forming portions 101 onto the intermediate transfer belt 107. With this, the toner images of respective colors are superimposed one on another on the intermediate transfer belt 107. That is, the toner images of four colors are transferred onto the intermediate transfer belt 107 (primary transfer). The toner images of four colors transferred onto the intermediate transfer belt 107 are transferred onto the sheet S conveyed from a manual feed cassette 114 or a sheet feed cassette 115 to a secondary transfer portion by the secondary transfer device 112 (secondary transfer). Then, the unfixed toner images on the sheet S are heated and fixed onto the sheet S by the fixing device 113, to thereby form a full-color image on the sheet S. The sheet S having the image formed thereon is delivered to a delivery portion 116.

[Photosensitive Drum and Light Scanning Device]

FIG. 1B is an illustration of configurations of the photosensitive drum 102, the light scanning device 104, and a control portion for the light scanning device 104. The light scanning device 104 includes a laser light source 201, a collimator lens 202, a cylindrical lens 203, and a rotary polygon mirror 204. The laser light source 201 includes a plurality of light emitting points. The plurality of light emitting points each emit a laser beam (light beam). The collimator lens 202 collimates the laser beam. The cylindrical lens 203 condenses the laser beam having passed through the collimator lens 202 in the sub-scanning direction. In the embodiment, the laser light source 201 is described by exemplifying a light source in which a plurality of light emitting points are arranged, but is similarly operated also in the case of using a single light source. The laser light source 201 is driven by a laser drive circuit 304. The rotary polygon mirror 204 is formed of a motor portion configured to be operated to rotate and a reflection mirror mounted on a motor shaft. A face of the reflection mirror of the rotary polygon mirror 204 is hereinafter referred to as "mirror face". The rotary polygon mirror 204 is driven by a rotary polygon mirror drive portion 305. The light scanning device 104 includes fθ lenses 205 and 206 configured to receive a laser beam (scanning light) deflected by the rotary polygon mirror 204. Further, the light scanning device 104 includes a memory (storage unit) 302 configured to store various pieces of information.

Further, the light scanning device 104 includes a beam detector 207 (hereinafter referred to as "BD 207") that is a signal generating unit configured to detect the laser beam deflected by the rotary polygon mirror 204 and output a horizontal synchronization signal (hereinafter referred to as "BD signal") in accordance with the detection of the laser beam. The laser beam output from the light scanning device 104 scans the photosensitive drum 102. The scanning direction of the laser beam is substantially parallel to the rotary shaft of the photosensitive drum 102. Every time the mirror face of the rotary polygon mirror 204 scans the photosensitive drum 102, the light scanning device 104 causes a laser beam emitted from the laser light source 201 to move (perform scanning) in the main scanning direction, to thereby form scanning lines corresponding to the number of laser elements (light emitting points) simultaneously. In the embodiment, a configuration is described in which the rotary polygon mirror 204 has five mirror faces, and the laser light source 201 includes eight laser elements, as an example. In the embodiment, an image of eight lines is formed with one mirror face of the rotary polygon mirror 204, that is, one scanning with laser light. The rotary polygon mirror 204 performs scanning with laser light five times per one revolution of the rotary polygon mirror 204, to thereby form an image of forty lines.

As a second detector, a thermistor 309 configured to detect a temperature of the fθ lens 206 is arranged near the fθ lens 206. Further, as a first detector, a thermistor 308 configured to detect a temperature of a laser element is arranged near the laser light source 201. The thermistors 308 and 309, which are the detectors, are connected to the CPU 303 so that the CPU 303 performs a temperature detecting operation.

Figure 2:
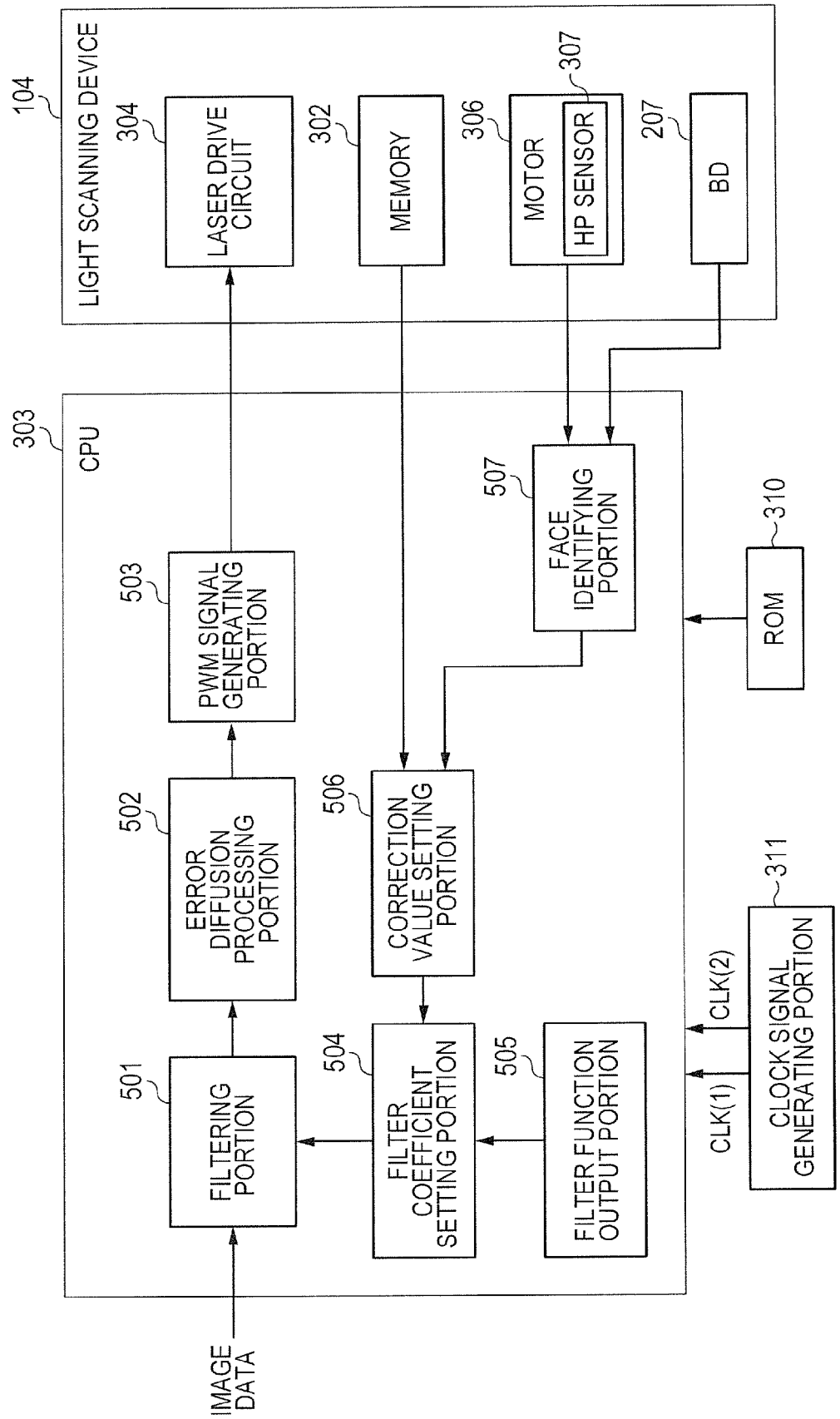
FIG. 2 is a block diagram of the image forming apparatus according to the embodiment.

Next, the CPU 303 serving as a control portion of the light scanning device 104, and a clock signal generating portion 311 are described with reference to FIG. 2. The CPU 303 and the clock signal generating portion 311 are mounted on the image forming apparatus 100. FIG. 2 is a block diagram for illustrating the functions of the CPU 303 as a correction unit, a transformation unit, and a filtering unit, for executing correction processing of correcting distortion and uneven image density of an image, which are described later. The CPU 303 includes a filtering portion 501, an error diffusion processing portion 502, and a pulse width modulation (PWM) signal generating portion 503. The filtering portion 501 is configured to perform filtering by subjecting input image data to a convolution operation. The error diffusion processing portion 502 is configured to subject the image data after the filtering to error diffusion processing. The PWM signal generating portion 503 is configured to subject the image data (density data) after the error diffusion processing to PWM transformation and output a PWM signal to the laser drive circuit 304 of the light scanning device 104. The clock signal generating portion 311 outputs a clock signal CLK(1) and a clock signal CLK(2) to the CPU 303. The clock signal CLK(1) is a signal generated by multiplying the clock signal CLK(2). Thus, the clock signal CLK(1) and the clock signal CLK(2) have a synchronization relationship. In the embodiment, the clock signal generating portion 311 outputs the clock signal CLK(1) generated by multiplying the clock signal CLK(2) by 16 to the CPU 303. The clock signal CLK(2) is a signal having a period corresponding to one pixel. The clock signal CLK(1) is a signal having a period corresponding to divided pixels obtained by dividing one pixel by 16.

Further, the CPU 303 includes a filter coefficient setting portion 504, a filter function output portion 505, and a correction value setting portion 506. The filter function output portion 505 is configured to output data on a function to be used for a convolution operation (for example, data in a table) to the filter coefficient setting portion 504. As a function to be used for the convolution operation, there is given, for example, linear interpolation and bicubic interpolation. The correction value setting portion 506 identifies a mirror face that is to reflect a laser beam from among the plurality of mirror faces, based on a face synchronization signal input from a face identifying portion 507. The correction value setting portion 506 determines a positional deviation amount in the rotation direction of the photosensitive drum 102 of a scanning line formed with a laser beam deflected by the identified mirror face. The correction value setting portion 506 then calculates a correction value based on the determined positional deviation amount and outputs the calculated correction value to the filter coefficient setting portion 504. The filter coefficient setting portion 504 calculates a filter coefficient based on information on the convolution function input from the filter function output portion 505 and the correction value input from the correction value setting portion 506. The filter coefficient is used for the filtering in the filtering portion 501. The filter coefficient setting portion 504 sets the calculated filter coefficient in the filtering portion 501. The correction value that is input to the filter coefficient setting portion 504 from the correction value setting portion 506 is a correction value set individually for each of the plurality of mirror faces.

Further, the CPU 303 includes the face identifying portion 507. The face identifying portion 507 is configured to identify a mirror face of the rotary polygon mirror 204 based on an HP signal input from a home position sensor (hereinafter referred to as "HP sensor") 307 of the light scanning device 104 and the BD signal input from the BD 207. The face identifying portion 507 is configured to output information of the identified mirror face to the correction value setting portion 506 as the face synchronization signal.

As illustrated in FIG. 1B, the CPU 303 receives image data from an image controller (not shown) configured to generate image data. The image data is gradation data indicating a density value. The gradation data is data of a plurality of bits indicating a density value for each pixel. For example, in the case of image data of 4 bits, a density value of one pixel is expressed by 16 gradations, and in the case of image data of 8 bits, a density value of one pixel is expressed by 256 gradations. In the embodiment, the image data input to the CPU 303 from the image controller is assumed to be 4 bits per pixel. The filtering portion 501 subjects the image data to filtering for each pixel in synchronization with the clock signal CLK(2). The CPU 303 is connected to the BD 207, the memory 302, and the rotary polygon mirror drive portion (hereinafter referred to as "mirror drive portion") 305. The CPU 303 detects a write position of a scanning line based on the BD signal input from the BD 207 and counts a time interval of the BD signal, to thereby detect the rotation speed of the rotary polygon mirror 204. Further, the CPU 303 outputs an acceleration or deceleration signal for designating acceleration or deceleration to the mirror drive portion 305 so that the rotary polygon mirror 204 reaches a predetermined speed. The mirror drive portion 305 is configured to supply a driving current to the motor portion of the rotary polygon mirror 204 in accordance with the acceleration or deceleration signal input from the CPU 303, to thereby drive a motor 306.

As illustrated in FIG. 2, the HP sensor 307 is mounted on the rotary polygon mirror 204 and outputs the HP signal to the CPU 303 at timing at which the rotary polygon mirror 204 reaches a predetermined angle during a rotation operation. For example, the HP signal is generated once during every rotation of the rotary polygon mirror 240. The face identifying portion 507 resets an internal counter in response to the generation of the HP signal. Then, the face identifying portion 507 increments a count value of the internal counter by "1" every time the BD signal is input. That is, each count value of the internal counter is information indicating a corresponding one of the plurality of mirror faces of the rotary polygon mirror 204. The CPU 303 can identify which of the plurality of mirror faces the input image data corresponds to with use of the count value. That is, the CPU 303 can switch a filter coefficient for correcting the input image data with use of the count value.

The memory 302 that is a first storage unit stores positional deviation information for each mirror face, which indicates how much each of a plurality of laser beams reflected by the mirror faces of the rotary polygon mirror 204 deviates from an ideal scanning position in the sub-scanning direction (rotation direction of photosensitive drum 102). The positional deviation information includes positional deviation information (first deviation amount) in the sub-scanning direction due to an optical face tangle error of each mirror face of the rotary polygon mirror 204, and positional deviation information (second deviation amount) in the sub-scanning direction due to the eccentricity of each mirror face of the rotary polygon mirror 204. The correction value setting portion 506 reads, from the memory 302, the positional deviation information (first deviation amount) in the sub-scanning direction due to an optical face tangle error of each mirror face of the rotary polygon mirror 204, and the positional deviation information (second deviation amount) in the sub-scanning direction due to the eccentricity of each mirror face of the rotary polygon mirror 204. The CPU 303 calculates position information of each scanning line based on the positional deviation information read from the memory 302.

The correction value setting portion 506 calculates a correction value based on the position information of each scanning line determined from the positional deviation information input from the memory 302, and outputs the calculated correction value to the filter coefficient setting portion 504. The filter coefficient setting portion 504 calculates a filter coefficient by using the correction value input from the correction value setting portion 506 and a filter function input from the filter function output portion 505. The filtering portion 501 receives image data from the image controller (not shown) configured to generate image data. The filtering portion 501 performs filtering on the image data based on the filter coefficient input from the filter coefficient setting portion 504, and calculates image data taking information for correcting the position of each scanning line into account. The PWM signal generating portion 503 of the CPU 303 converts the image data taking the information for correcting the position of each scanning line into account into drive data. A ROM 310 stores a conversion table of FIG. 17 for converting image data of 4 bits into drive data of 16 bits. The vertical axis of the conversion table of FIG. 17 represents image data indicating density values of 4 bits, which corresponds to one pixel. The horizontal axis of the conversion table of FIG. 17 represents drive data of 16 bits associated with the density values of 4 bits individually. For example, in the case where image data input to the PWM signal generating portion 503 is a bit pattern of "0110", the PWM signal generating portion 503 converts the image data "0110" into drive data that is a bit pattern of "0000000001111111" with use of the conversion table. The PWM signal generating portion 503 outputs drive data after the conversion in the order of "0000000001111111" serially on a bit basis in accordance with the clock signal CLK(1) described later. When the PWM signal generating portion 503 outputs the drive data, a PWM signal is generated. When the PWM signal generating portion 503 outputs "1", the light emitting point emits a laser beam. When the PWM signal generating portion 503 outputs "0", the light emitting point does not output a laser beam.

[Positional Deviation Information for Each Mirror Face]

Figures 3A, 3B:
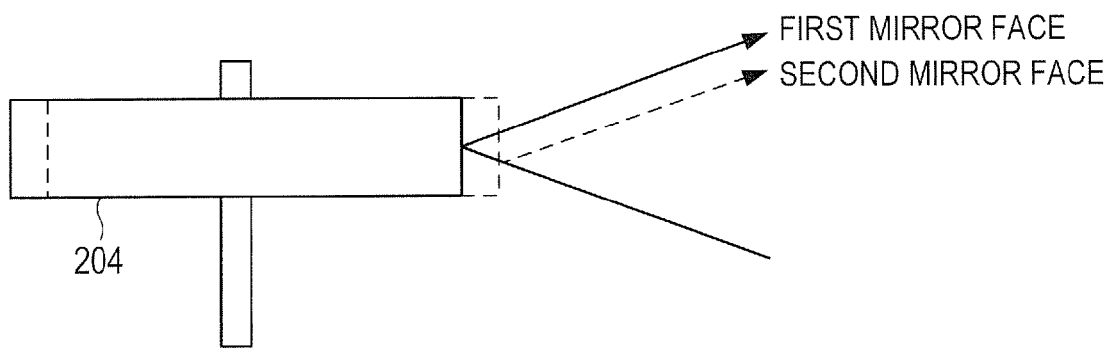
FIG. 3A is a table for showing the components of position information for each mirror face.
FIG. 3B is a diagram for illustrating beam positional deviation due to eccentricity.

FIG. 3A is a table for showing examples of the position information for each mirror face of the rotary polygon mirror 204, which is stored in the memory 302. In FIG. 3A, each column on the left side represents the numbers of the mirror faces (face number in FIG. 3A) of the rotary polygon mirror 204, each column in the middle represents optical face tangle error information (positional deviation component due to optical face tangle error amount) of each mirror face of the rotary polygon mirror 204, and each column on the right side represents eccentricity information (positional deviation component due to mirror face eccentric amount) of each mirror face of the rotary polygon mirror 204. Further, the memory 302 stores positional deviation components X1 to X5 as the optical face tangle error information and positional deviation components Y1 to Y5 as the eccentricity information in association with the face numbers 1 to 5 of the rotary polygon mirror 204.

Here, the term "optical face tangle error" refers to positional deviation with respect to the rotation axis of the rotary polygon mirror 204, which is caused by a variation in angle of mirror faces of the rotary polygon mirror 204. When the angles of the mirror faces vary, as illustrated in FIG. 16A and FIG. 16B referred to above, the incident angle of a light beam entering the photosensitive drum 102 varies between the respective mirror faces of the rotary polygon mirror 204, and positional deviation amounts differ from each other depending on the positions in the z-direction. In addition, the optical face tangle error has another characteristic in that a positional deviation amount of a position that is scanned with a light beam changes due to a change in temperature in the light scanning device 104.

Meanwhile, the term "eccentricity" refers to a state in which the rotation axis of the rotary polygon mirror 204 deviates from the center of the rotary polygon mirror 204. FIG. 3B is a diagram for illustrating positional deviation of a light beam due to eccentricity. In the schematic diagram of FIG. 3B, the solid line represents the position state of the first mirror face of the rotary polygon mirror 204 and the optical path of a light beam from the first mirror face, whereas the broken line represents the position state of the second mirror face and the optical path of a light beam from the second mirror face. The light beam is reflected by the mirror faces located at different positions due to eccentricity. In the embodiment, it is assumed that the image forming apparatus is designed to have an optical path in which a light beam enters the mirror faces of the rotary polygon mirror 204 at a certain angle. As described above, when a light beam enters the mirror faces at a certain angle, as illustrated in FIG. 3B, positional deviation occurs, that is, the light beam is reflected at different positions due to the eccentricity of the rotary polygon mirror 204. The positional deviation due to the eccentricity is, as illustrated in FIG. 3B, a phenomenon in which the path of a light beam moves in parallel between the respective mirror faces of the rotary polygon mirror 204, and is positional deviation that is not affected by the refractive index of the lens. Thus, the eccentricity has a characteristic in that a positional deviation amount is constant even when ambient temperature changes. In the embodiment in which the laser light source including the plurality of light emitting points is used as described above, positional deviation due to an error in interval between the light emitting points is ignored.

[Measurement of Positional Deviation Amount]

A positional deviation amount due to an optical face tangle error amount and a positional deviation amount due to a mirror face eccentric amount of the light scanning device 104 are measured in an adjustment step in the factory.

Figure 4A:
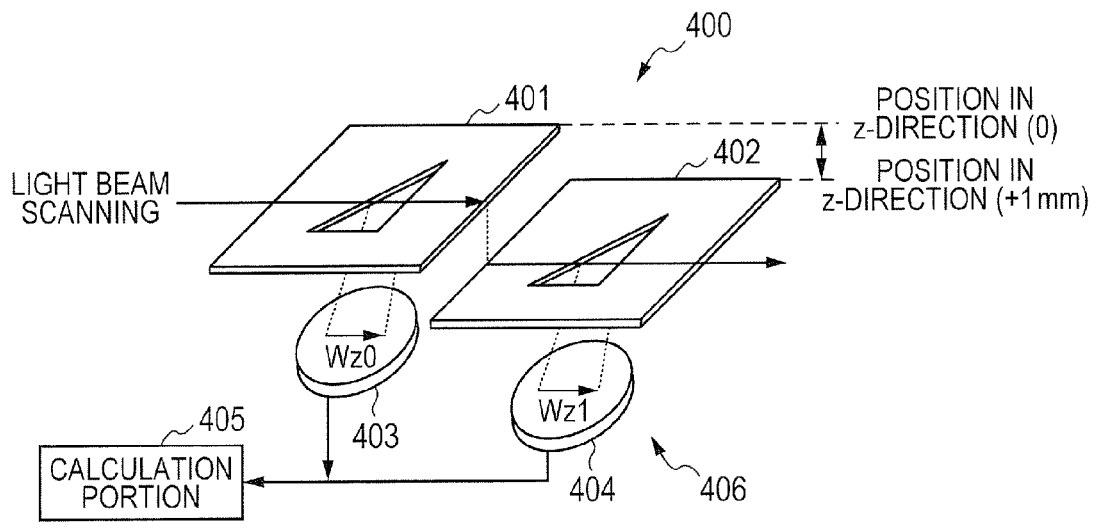
FIG. 4A and FIG. 4B are each a diagram for illustrating a positional deviation measurement method that is employed in a measurement step in a factory.

FIG. 4A is a diagram for illustrating an example of a positional deviation detecting device 400, which is used for measurement in the factory. In the adjustment step by the light scanning device 104, the positional deviation detecting device 400 is arranged at a position corresponding to a position at which the photosensitive drum 102 is located when the light scanning device 104 is mounted on the image forming apparatus 100. The positional deviation detecting device 400 includes a measurement portion 406 and a calculation portion 405 illustrated in FIG. 4A. The calculation portion 405 is configured to receive a result of measurement by the measurement portion 406, and a face synchronization signal from the face identifying portion 507 of the CPU 303 of FIG. 2.

The positional deviation detecting device 400 is configured to measure the position in the sub-scanning direction of a light beam emitted from the light scanning device 104 for each mirror face of the rotary polygon mirror 204, and includes masks 401 and 402, and photodiodes (PD) 403 and 404. In FIG. 4A, the masks 401 and 402 are scanned with a light beam emitted from the light scanning device 104 (light beam scanning in FIG. 4A). The position of the mask 401 is determined such that the mask 401 and the light scanning device 104 have substantially the same positional relationship as that between the photosensitive drum 102 and the light scanning device 104. That is, the mask 401 is positioned at the z-direction position (0) being the conjugate point described above. Meanwhile, the position of the mask 402 is determined such that the mask 402 is positioned at a position away from a position that is substantially the same as that of the photosensitive drum 102 by 1 mm with respect to the light scanning device 104 (z-direction position (+1 mm) in FIG. 4A). The PDs 403 and 404, which are configured to output electrical signals in response to incident light, receive light beams (scanning beams) having passed through triangular slits formed in the masks 401 and 402, respectively.

As illustrated in FIG. 4A, light beams received by the PDs 403 and 404 after passing through the masks 401 and 402 have widths (widths in the main scanning direction) Wz0 and Wz1, respectively. The widths Wz0 and Wz1, which are distances in the main scanning direction, can be calculated based on duration of signals output from the PDs 403 and 404, and a speed of scanning the masks 401 and 402 with a light beam from the light scanning device 104. Here, the duration of the signals output from the PDs 403 and 404 refers to a period of time from when the PDs 403 and 404 receive light beams to output electrical signals until the light beams are blocked so that no electrical signal is output.

As illustrated in FIG. 4A, the masks 401 and 402 have formed therein the triangular slits, and the widths Wz0 and Wz1 change depending on the position in the sub-scanning direction of a light beam for scanning. The position of the light beam scanning in FIG. 4A is detected based on the pulse widths Wz0 and Wz1 of signals that the PDs 403 and 404 output when detecting light beams. Thus, the position in the sub-scanning direction of the light beam can be determined through measurement of the pulse widths. In positional deviation detection, the widths Wz0 and Wz1 in the main scanning direction are measured for each mirror face of the rotary polygon mirror 204, and a positional deviation amount in the sub-scanning direction of each mirror face of the rotary polygon mirror 204 is calculated based on the measured widths Wz0 and Wz1. Detection of a difference between the width Wz0 and the width Wz1 (=width Wz1− width Wz0) enables calculation of a positional deviation amount in the sub-scanning direction at a time when the conjugate point shifts by 1 mm. As described above, the width Wz0 is a measurement result at the conjugate point, and hence the width Wz0 hardly includes a positional deviation component due to an optical face tangle error. That is, the width Wz0 has a value substantially equal to that of a positional deviation amount caused by the eccentricity of the mirror faces. Thus, a positional deviation amount in the sub-scanning direction calculated based on the width Wz0 is detected as eccentricity components of the mirror faces.

Figure 4B:
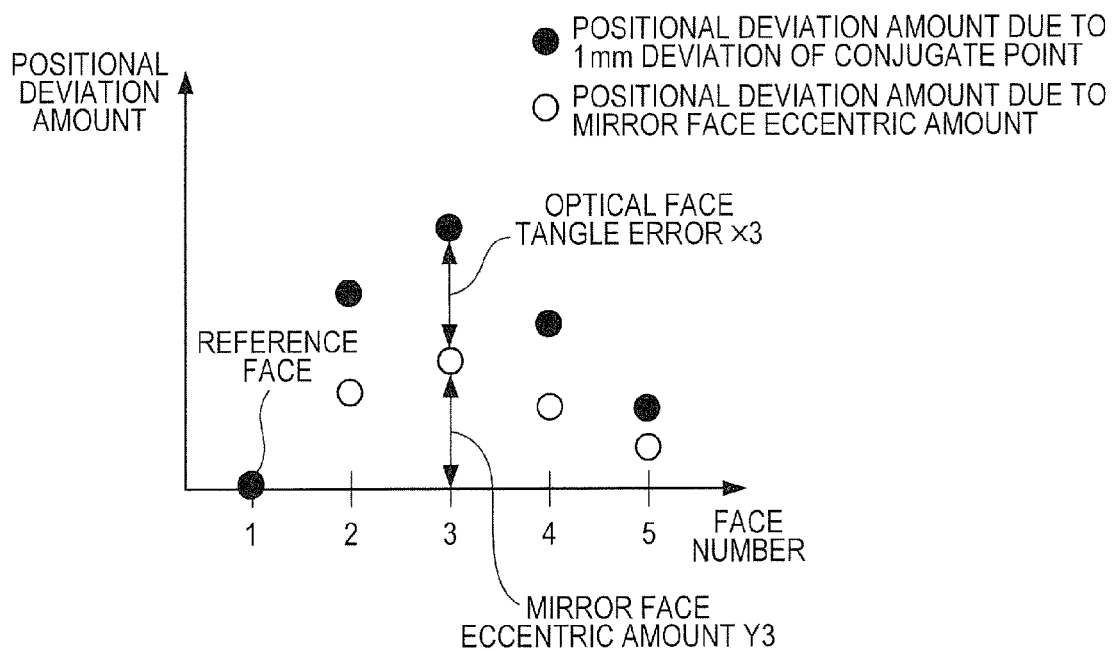

FIG. 4B is a diagram for illustrating a relationship of a positional deviation amount to the mirror face of the rotary polygon mirror 204. The horizontal axis of FIG. 4B represents the mirror faces (face numbers 1 to 5) of the rotary polygon mirror 204, and the vertical axis represents a positional deviation amount in the sub-scanning direction. Further, in FIG. 4B, white circles represent positional deviation amounts in the sub-scanning direction due to the eccentricity of the mirror face, and black circles represent positional deviation amounts in the sub-scanning direction at the time when the conjugate point deviates by 1 mm. In the above description, a deviation amount in the sub-scanning direction is calculated for each mirror face, but in FIG. 4B, the first mirror face with the face number 1 is used as a reference face, and both of a mirror eccentric amount and an optical face tangle error amount are 0. The white circles at the mirror face numbers 2 to 5 represent positional deviation amounts due to the eccentricity of the mirror faces with respect to the first mirror face, that is, differences from a positional deviation amount due to the eccentricity of the first mirror face being the reference face. Similarly, the black circles at the mirror face numbers 2 to 5 represent positional deviation amounts in the sub-scanning direction at the time when the conjugate points deviate by 1 mm with respect to the first mirror face, that is, differences from a positional deviation amount in the sub-scanning direction at the time when the conjugate point of the first mirror face being the reference face deviates by 1 mm.

The measurement portion 406 of the positional deviation detecting device 400 outputs to the calculation portion 405, for every mirror face, positional deviation components X (X1 to X5) in the sub-scanning direction of the respective mirror faces due to optical face tangle errors and positional deviation components Y (Y1 to Y5) in the sub-scanning direction of the respective mirror faces due to the eccentricity of the faces, which are detected through measurement and correspond to the mirror faces of the rotary polygon mirror 204. Further, the face identifying portion 507 (FIG. 2) identifies the mirror face of the rotary polygon mirror 204, and outputs information on the identified mirror face to the calculation portion 405 as the face synchronization signal. The calculation portion 405 writes information on the positional deviation component X due to the optical face tangle error amount and the positional deviation component Y due to the mirror face eccentric amount, which are measured by the measurement portion 406, to an address on the memory 302 of the light scanning device 104 corresponding to the information on the mirror face of the rotary polygon mirror 204, which is input from the face identifying portion 507. In this way, the positional deviation components X1 to X5 in the sub-scanning direction due to the optical face tangle errors, and the positional deviation components Y1 to Y5 in the sub-scanning direction due to the eccentricity of the mirror faces are stored in the memory 302 provided to the light scanning device 104, in association with the mirror faces of the rotary polygon mirror 204.

(Method of Performing Filter Operation on Image Data)

Figure 5:
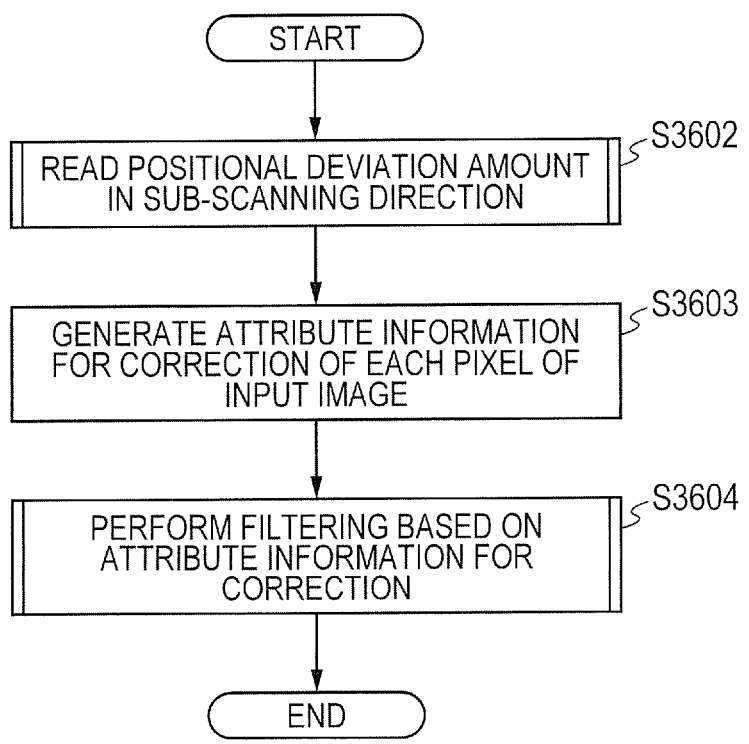
FIG. 5 is a flowchart for illustrating optical face tangle error correction processing according to the embodiment.

In the embodiment, the CPU 303 corrects image data through a filter operation based on the positional deviation amounts in the sub-scanning direction of the scanning lines formed by laser beams, and outputs the corrected image data to the laser drive circuit 304. The filter operation specifically is a calculation of performing convolution processing. In the embodiment, the convolution processing is performed based on the image data and the positional deviation amount. Now, a flowchart of FIG. 5 will be described below. FIG. 5 is a flowchart for illustrating the correction processing for correcting uneven image density and banding caused by the positional deviation in the sub-scanning direction. In Step (hereinafter abbreviated as "S") 3602, the CPU 303 reads the positional deviation amount in the sub-scanning direction corresponding to the mirror face of the rotary polygon mirror 204, which is stored in the memory 302. Specifically, the CPU 303 reads the positional deviation information corresponding to the mirror face from the memory 302 out of the positional deviation information X1 to X5 due to the optical face tangle errors, and the positional deviation information Y1 to Y5 due to the eccentricity of the faces, which are described with reference to FIG. 3A. The CPU 303 corrects the positional deviation amount in the sub-scanning direction based on the read positional deviation amount and information on a temperature in the light scanning device 104. After that, the CPU 303 corrects a pixel position in the sub-scanning direction of the input image data based on the positional deviation amount, and then performs filtering to output the image data, namely, density. Convolution processing according to the embodiment involves correcting sparseness and denseness of density in the sub-scanning direction caused by deviation of a scanning line in the sub-scanning direction by moving a pixel of interest in the sub-scanning direction in accordance with the deviation of the scanning line. Further, the convolution processing involves correcting the sparseness and denseness of density by causing a pixel value of the pixel of interest to be output or not to be output depending on the movement in the sub-scanning direction.

(State of Positional Deviation of Scanning Line)

The state of positional deviation of a scanning line can be roughly classified into four cases. First, regarding the state of positional deviation, there is a case (a) in which the position of a scanning line (hereinafter referred to as "scanning position") on the photosensitive drum 102 is shifted in an advance direction with respect to an ideal scanning position, and a case (b) in which the scanning position on the photosensitive drum 102 is shifted in a return direction with respect to the ideal scanning position. Further, regarding the state of positional deviation, there is a case (c) in which the scanning positions on the photosensitive drum 102 are dense with respect to the ideal scanning positions, and a case (d) in which the scanning positions on the photosensitive drum 102 are sparse with respect to the ideal scanning positions. Specific examples of the state of positional deviation in the sub-scanning direction are illustrated in FIG. 6A, FIG. 6B, FIG. 6C, and FIG. 6D. In FIG. 6A to FIG. 6D, the broken lines represent scanning positions, and in FIG. 6A to FIG. 6D, (1) to (5) represent the order of scanning. In the embodiment, eight beams are used for scanning simultaneously, but description is given on the assumption that the order is allocated to each beam arranged successively in the sub-scanning direction. Each column on the left side of FIG. 6A to FIG. 6D represents ideal scanning positions, and each column on the right side represents scanning positions on the photosensitive drum 102. S1 to S5 represent positional deviation amounts from the ideal scanning positions with respect to scanning numbers (1) to (5). The unit of a positional deviation amount is represented based on the case where the ideal beam interval (21.16 µm at 1,200 dpi) is defined as 1, and the advance direction of a laser beam in the sub-scanning direction (hereinafter simply referred to as "advance direction") is set to a positive value. Further, the return direction of the laser beam in the sub-scanning direction (hereinafter simply referred to as "return direction") is set to a negative value. Further, in order to describe the state of an image, each pixel arranged in the sub-scanning direction is represented by a circle on the scanning line. The shading of the circle represents density.

Figure 6A:
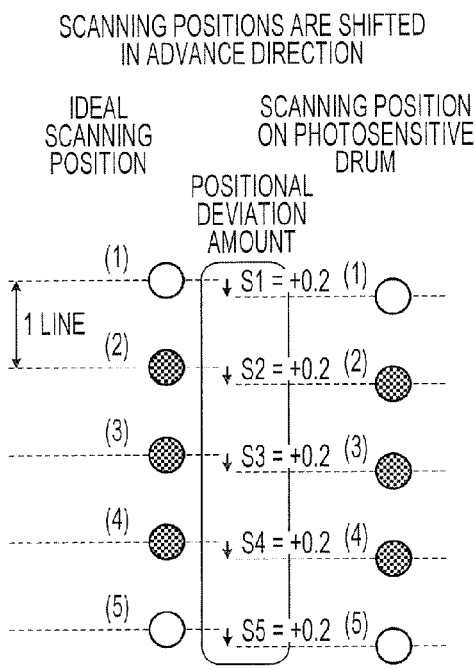
FIG. 6A, FIG. 6B, FIG. 6C, and FIG. 6D are each a diagram for illustrating positional deviation of pixels for each classification according to the embodiment.
Figure 6B:
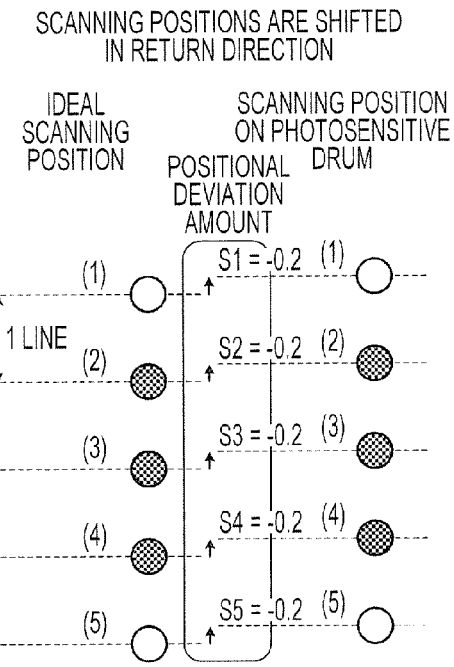

FIG. 6A is an illustration of an example in which the scanning positions on the photosensitive drum 102 are shifted by 0.2 uniformly in the advance direction from the ideal scanning positions. The positional deviation amount as illustrated in FIG. 6A is hereinafter referred to as a shift amount of +0.2. FIG. 6B is an illustration of an example in which the scanning positions on the photosensitive drum 102 are shifted by 0.2 uniformly in the return direction from the ideal scanning positions. The positional deviation amount as illustrated in FIG. 6B is hereinafter referred to as a shift amount of −0.2 line. In FIG. 6A and FIG. 6B, the scanning positions are shifted uniformly, and hence the interval between the scanning positions on the photosensitive drum 102 is 1 in both the cases.

Figure 6C:
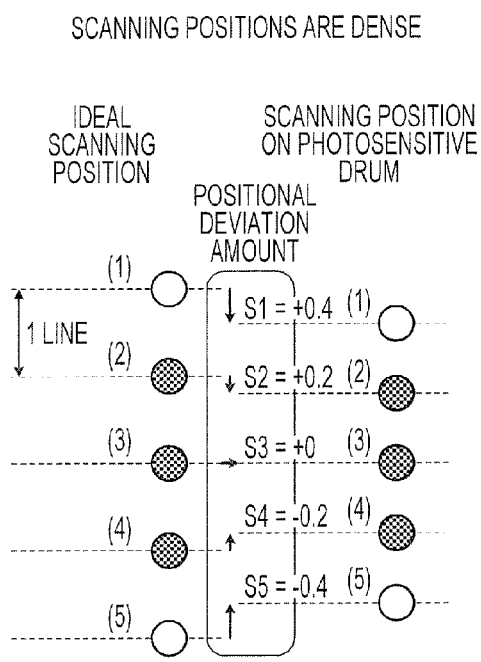

In FIG. 6C, the positional deviation amount is 0 at a predetermined scanning position on the photosensitive drum 102. However, as the scanning position returns backward from the scanning position of the positional deviation amount of 0, the positional deviation amount in the advance direction increases, and as the scanning position proceeds forward from the scanning position of the positional deviation amount of 0, the positional deviation amount in the return direction increases. For example, S3 is +0 in the scanning number (3), but S2 is +0.2 in the scanning number (2), S1 is +0.4 in the scanning number (1), S4 is −0.2 in the scanning number (4), and S5 is −0.4 in the scanning number (5). In FIG. 6C, the interval between the scanning positions is 0.8, which is smaller than 1. The state of positional deviation as illustrated in FIG. 6C is hereinafter referred to as being dense at an interval of a (1−0.2) line.

Figure 6D:
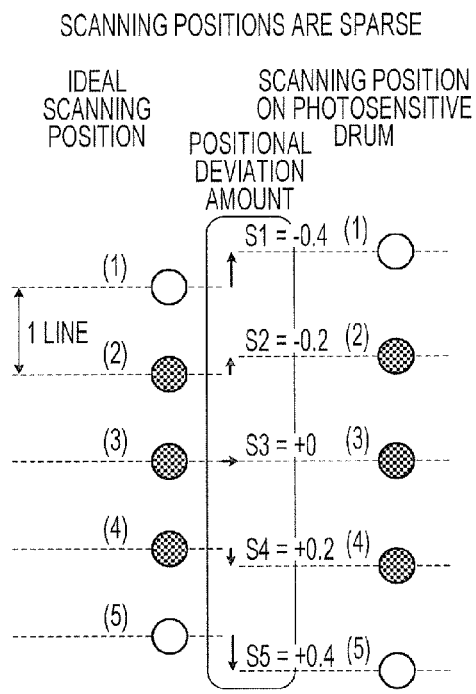

In FIG. 6D, the positional deviation amount is 0 at a predetermined scanning position on the photosensitive drum 102. However, as the scanning position returns backward from the scanning position of the positional deviation amount of 0, the positional deviation amount in the return direction increases, and as the scanning position proceeds forward from the scanning position of the positional deviation amount of 0, the positional deviation amount in the advance direction increases. For example, S3 is +0 in the scanning number (3), but S2 is −0.2 in the scanning number (2), S1 is −0.4 in the scanning number (1), S4 is +0.2 in the scanning number (4), and S5 is +0.4 in the scanning number (5). In FIG. 6D, the interval between the scanning positions is 1.2, which is larger than 1. The state of positional deviation as illustrated in FIG. 6D is hereinafter referred to as being sparse at an interval of a (1+0.2) line.

In the dense state as illustrated in FIG. 6C, positional deviation occurs, and in addition, the scanning positions are dense to cause pixels to be arranged densely on the photosensitive drum 102, with the result that a pixel value per predetermined area increases, to thereby increase density. In contrast, in the sparse state as illustrated in FIG. 6D, positional deviation occurs, and in addition, the scanning positions are sparse to cause pixels to be arranged sparsely on the photosensitive drum 102, with the result that a pixel value per predetermined area decreases, to thereby decrease density. In an electrophotographic process, a shading difference may be further emphasized due to a relationship between the depth of a latent image potential and development characteristics. Further, when the dense or sparse state occurs alternately as illustrated in FIG. 6C and FIG. 6D, periodic shading causes moire, which is liable to be detected visually even at the same amount depending on a space frequency.

Referring back to the flowchart of FIG. 5, in S3603, the CPU 303 generates attribute information for correction of each pixel of an input image with the correction value setting portion 506. In the embodiment, the pixel position in the sub-scanning direction of an input image is subjected to coordinate transformation in advance and interpolated, thereby being capable of correcting positional deviation and correcting local shading simultaneously while maintaining density of the input image. The attribute information for correction specifically refers to a correction value C described later.

(Coordinate Transformation)

A method for coordinate transformation according to the embodiment will be described with reference to FIG. 7A, FIG. 7B, FIG. 8A, FIG. 8B, FIG. 8C, FIG. 8D, FIG. 9A, and FIG. 9B. In each graph of FIG. 7A to FIG. 9B, the horizontal axis represents a pixel number "n" (number representing an n-th pixel), and the vertical axis represents a pixel position (which is also a scanning position) "y" (y' after the coordinate transformation) in the sub-scanning direction, with the unit being a line. Further, FIG. 7A, FIG. 7B, FIG. 9A, and FIG. 9B correspond to FIG. 6A, FIG. 6B, FIG. 6C, and FIG. 6D, respectively. Each graph on the left side of FIG. 7A, FIG. 7B, FIG. 9A, and FIG. 9B represents the state before the coordinate transformation, and each graph on the right side thereof represents the state after the coordinate transformation for the y-axis. Square dots plotted in each graph represent scanning positions on the photosensitive drum 102, and circular dots therein represent ideal scanning positions.

(Case of Being Shifted in Advance Direction and Return Direction)

Figure 7A:
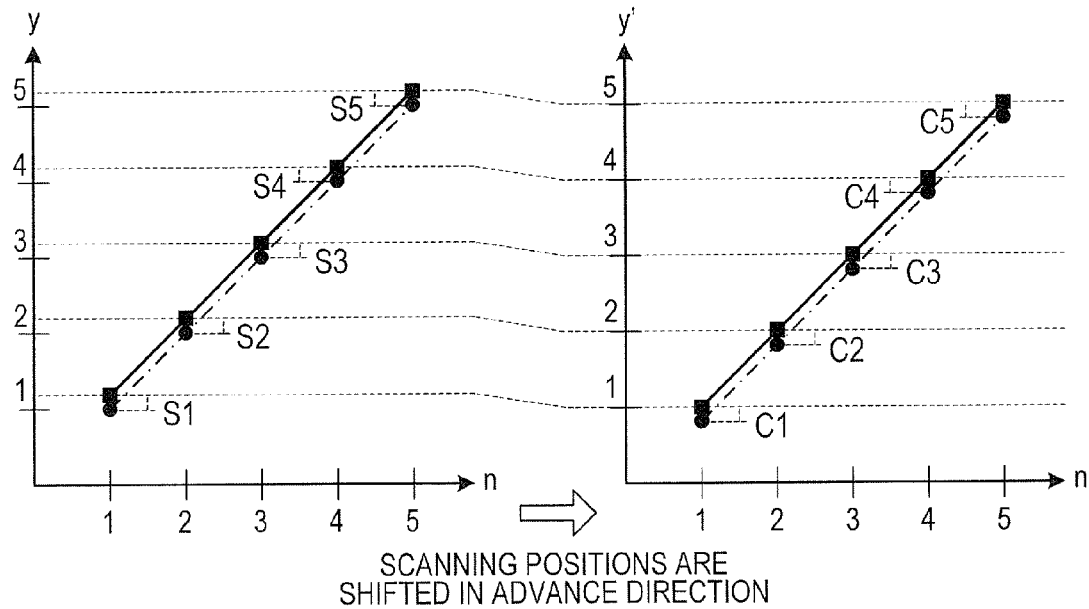
FIG. 7A and FIG. 7B are each a graph for showing coordinate transformation of pixel positions in a sub-scanning direction according to the embodiment.

The graph on the left side of FIG. 7A is first described. In the graph before the coordinate transformation, at the ideal scanning positions plotted with the circular dots, for example, a pixel position "y" in the sub-scanning direction is 2 with respect to the pixel number 2. Thus, the y-coordinate of the pixel position "y" is equal to that of the pixel number "n", and the ideal scanning positions are represented by a straight line (indicated by the alternate long and short dash line) with a gradient of 1. The straight line of the alternate long and short dash line is represented by Expression (1).

$$y=n \qquad \text{Expression (1)}$$

As illustrated in FIG. 6A, the scanning positions plotted with the square dots are shifted by S (=0.2) line in the advance direction (+direction of y-axis) with respect to the ideal scanning positions plotted with the circular dots. Therefore, the scanning positions plotted with the square dots are represented by a straight line (indicated by the solid line) offset with the gradient being 1, which is represented by Expression (2).

$$y=n+S \qquad \text{Expression (2)}$$

In the embodiment, the coordinate transformation is performed so that the actual scanning positions are transformed into the ideal scanning positions. Therefore, in the example illustrated in FIG. 7A, it is only necessary that the coordinate transformation be performed with use of Expression (3). In Expression (3), C represents a correction amount.

$$y'=y+C \qquad \text{Expression (3)}$$

Thus, the correction amount C is represented by a shift amount S and Expression (4).

$$C=-S \qquad \text{Expression (4)}$$

Through Expression (3) of the coordinate transformation and Expression (4) for determining the correction amount C, Expressions (1) and (2) are converted as represented by Expressions (5) and (6), respectively.

$$y'=y+C=n+(-S)=n-S \qquad \text{Expression (5)}$$

$$y'=y+C=(n+S)+C=(n+S)+(-S)=n \qquad \text{Expression (6)}$$

Figure 7B:
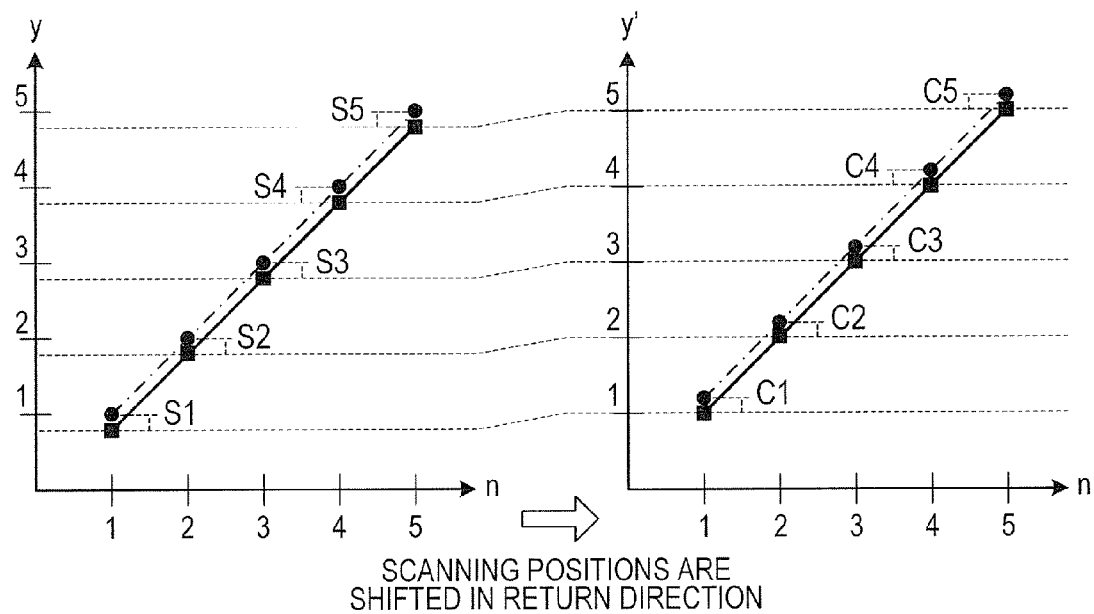

In FIG. 7B, when the shift amount S is defined as −0.2, Expression (6) similarly holds from Expression (1), and the similar description to that of FIG. 7A can be given. As illustrated in FIG. 7A and FIG. 7B, when the scanning lines are not sparse or dense, and are shifted in the advance direction or the return direction, a straight line has a predetermined gradient before and after the coordinate transformation.

(Case in which Dense or Sparse State Occurs)

Figure 8A:
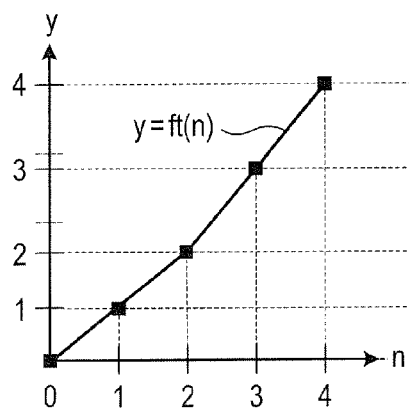
FIG. 8A, FIG. 8B, FIG. 8C, and FIG. 8D are each a graph for showing coordinate transformation of pixel positions in the sub-scanning direction according to the embodiment.
Figure 9A:
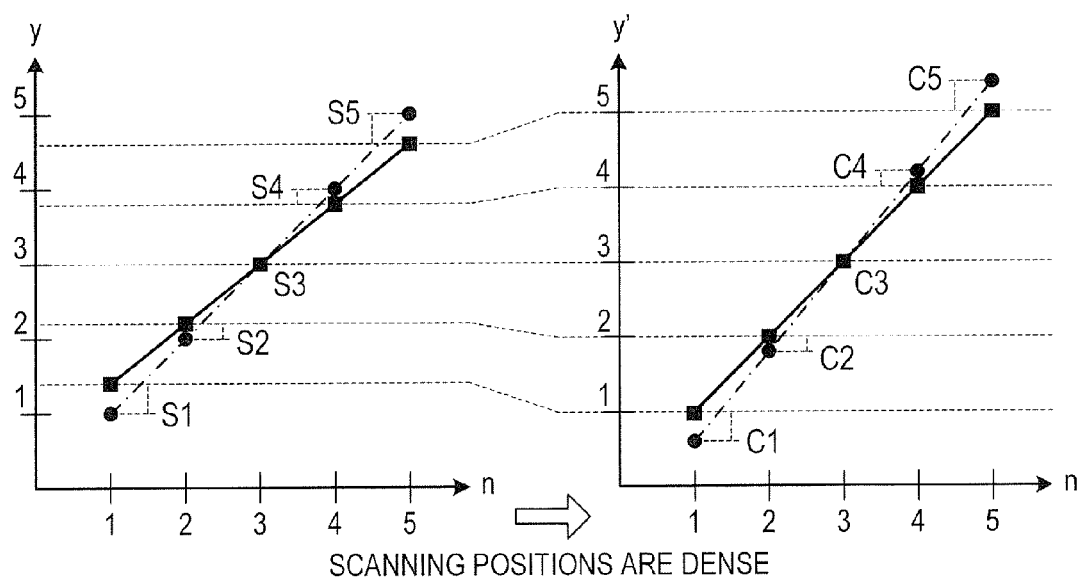
FIG. 9A and FIG. 9B are each a graph for showing coordinate transformation of pixel positions in the sub-scanning direction according to the embodiment.
Figure 9B:
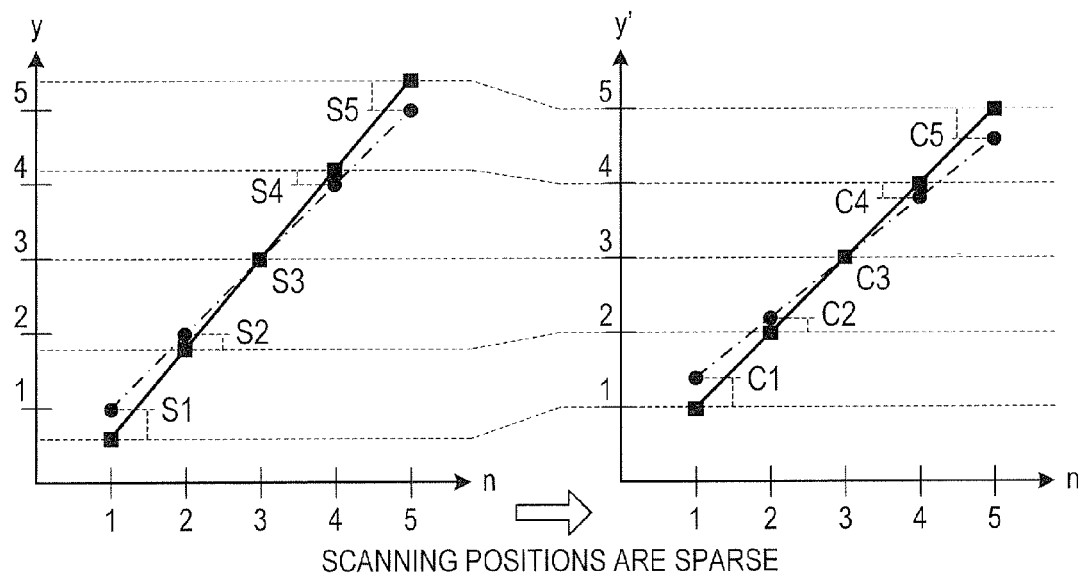

Now, the coordinate transformation is described, which is also applicable to the cases of FIG. 9A and FIG. 9B in which the scanning positions become dense or sparse, and the cases of combinations of FIG. 7A, FIG. 7B, FIG. 9A, and FIG. 9B in which the scanning positions shift and become dense or sparse. FIG. 8A is an illustration of a relationship between the pixel number and the scanning position, and the horizontal axis represents a pixel number "n", and the vertical axis "y" represents a scanning position in the sub-scanning direction, square dots being plotted as the scanning positions on the photosensitive drum 102. In FIG. 8A, the case will be described in which the scanning lines are dense on the photosensitive drum 102 within a range of the pixel number of n≤2, and the scanning lines are sparse on the photosensitive drum 102 within a range of the pixel number of n≥2.

As illustrated in FIG. 8A, when the scanning lines are dense within the range of the pixel number of n≤2, and are sparse within the range of the pixel number of n≥2, the gradient of a straight line within the range of the pixel number of n≤2 is different from that of a straight line within the range of the pixel number of n≥2, and the straight line has a curved shape at the pixel number of n=2. In FIG. 8A, a function indicating a change in scanning positions passing through the square dots is defined as ft(n) and is represented by the solid line. The function ft(n) representing the scanning positions is represented by Expression (7).

$$y=ft(n) \qquad \text{Expression (7)}$$

Next, when a function after the coordinate transformation of the y-axis that represents the scanning positions in the sub-scanning direction is defined as ft'(n), the function ft'(n) representing the scanning positions after the coordinate transformation is represented by Expression (8).

$$y'=ft'(n) \qquad \text{Expression (8)}$$

In the embodiment, the coordinate transformation is performed by expanding or contracting the y-axis or shifting the y-axis so that the scanning positions after the coordinate transformation become uniform. Therefore, the function ft'(n) representing the scanning positions after the coordinate transformation satisfies the condition represented by Expression (9).

$$ft'(n)=n \quad \text{Expression (9)}$$

Expression (9) means that, for example, a pixel position y' (=ft'(2)) in the sub-scanning direction after the coordinate transformation becomes 2 with respect to the pixel number 2.

Figure 8B:
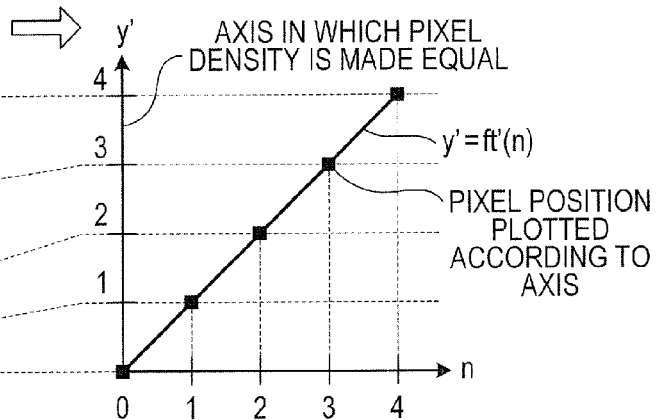
Figure 8C:
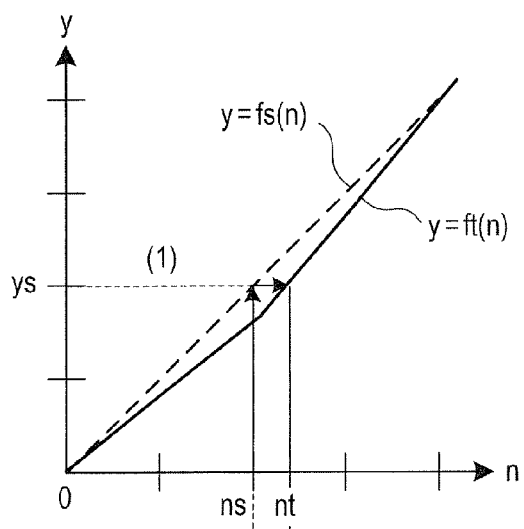
Figure 8D:
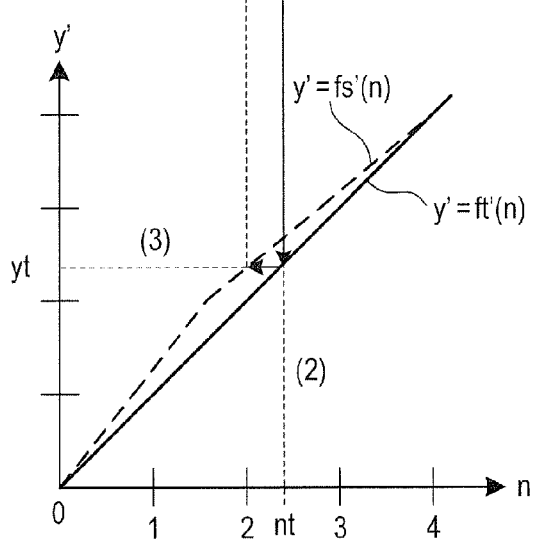

The broken lines connecting FIG. 8A and FIG. 8B to each other represent the correspondence from an original coordinate position of the y-axis to a coordinate position of the y'-axis after the coordinate transformation from the left to the right, and indicate a state in which a lower half (corresponding to n≤2) of the y-axis expands, and an upper half (corresponding to n≥2) contracts before and after the coordinate transformation. A procedure for determining a coordinate after the coordinate transformation of each pixel of input image data through the coordinate transformation of FIG. 8A and FIG. 8B will be described with reference to FIG. 8C and FIG. 8D. In the same manner as in FIG. 8A and FIG. 8B, the horizontal axis in FIG. 8C and FIG. 8D represents a pixel number "n", and a vertical axis "y" (or y') represents scanning positions in the sub-scanning direction. FIG. 8C is an illustration before the coordinate transformation, and FIG. 8D is an illustration after the coordinate transformation. A relationship between the pixel number "n" and the coordinate position "y" of the input image data will be described below. First, the broken line of FIG. 8C represents a function fs(n) representing ideal scanning positions before the coordinate transformation and is represented by Expression (10).

$$y=fs(n) \quad \text{Expression (10)}$$

Further, in the embodiment, the interval between the pixels in the sub-scanning direction of the input image data is uniform, and hence the function fs(n) is represented by Expression (11).

$$fs(n)=n \quad \text{Expression (11)}$$

A scanning position of the y'-coordinate after the coordinate transformation of a pixel number of interest ns of the input image data is determined through three steps described below. In the first step, when the y-coordinate of an ideal scanning position corresponding to the pixel number "ns" of the input image data is defined as "ys", "ys" can be determined by Expression (12).

$$ys=fs(ns) \quad \text{Expression (12)}$$

A pixel number "nt" in which the scanning position before the coordinate transformation is the same on the photosensitive drum 102 (solid line) is determined ((1) of FIG. 8C). The scanning position on the photosensitive drum 102 is represented by the function y=ft(n), and a relationship of ys=ft(nt) holds. When an inverse function of the function ft(n) is defined as ft$^{-1}$(y), the pixel number "nt" is represented by Expression (13).

$$nt=ft^{-1}(ys) \quad \text{Expression (13)}$$

In the second step, the y'-coordinate after the coordinate transformation (defined as "yt") corresponding to the pixel number "nt" of the scanning position on the photosensitive drum 102 is determined by Expression (14) with use of the function ft'(n) after the coordinate transformation ((2) of FIG. 8D).

$$yt=ft'(nt) \quad \text{Expression (14)}$$

The pixel number "ns" holds even when any number is selected, and hence an expression for determining the position "yt" of the y'-coordinate after the coordinate transformation based on the pixel number "ns" corresponds to the function fs'(n) for determining the y'-coordinate in calculation based on the pixel number "n" of the input image data. Thus, a general expression represented by Expression (15) is derived from Expressions (12) to (14). A function indicating the ideal scanning position represented by the broken line after the coordinate transformation is represented by y'=fs'(n) ((3) of FIG. 8D).

$$yt=fs'(ns)=ft'(nt)=ft'(ft^{-1}(ys))=ft'(ft^{-1}(fs(ns)))$$

"ns" is generalized into "n" to obtain Expression (15).

$$fs'(n)=ft'(ft^{-1}(fs(n))) \quad \text{Expression (15)}$$

Further, Expression (11) and Expression (9) in which the pixel interval of the input image data and the interval of the scanning positions after the coordinate transformation are set to be uniform, with the distance of 1, are substituted into Expression (15). Then, Expression (15) is represented by Expression (16) with use of the inverse function ft$^{-1}$(n) of the function ft(n) for deriving the scanning position from the pixel number "n".

$$fs'(n)=ft^{-1}(n) \quad \text{Expression (16)}$$

Expression (2) in which the scanning positions are shifted uniformly in the advance direction and the return direction as illustrated in FIG. 7A and FIG. 7B, and Expression (5) for determining a position after the coordinate transformation of the input image data also have an inverse function relationship, and it can be confirmed that Expression (16) holds. Further, when applied to the case in which the dense or sparse state occurs in the scanning positions as illustrated in FIG. 9A and FIG. 9B, the function "y" representing scanning positions before the coordinate transformation is represented by Expression (17) when the function "y" is a straight line with a gradient "k", passing through (n0, y0).

$$fs(n)=y=k\times(n-n0)+y0 \quad \text{Expression (17)}$$

In order to determine a pixel position after the coordinate transformation of the y-axis of the input image data, it is only necessary that an inverse function ((1/k)×(y−y0)+n0) be determined by Expressions (15) and (16), and the pixel number "n" be substituted into the inverse function, and hence Expression (18) is derived.

$$y'=(1/k)\times(n-y0)+n0 \quad \text{Expression (18)}$$

When the scanning lines illustrated in FIG. 9A are dense, and the scanning lines illustrated in FIG. 9B are sparse, the positions of the scanning lines on the photosensitive drum 102 after the coordinate transformation can be represented by Expression (18) in both the cases. Further, a correction value Cn of the pixel number "n" is determined by Cn=fs'(n)−fs(n).

Specifically in FIG. 9A, n0=y0=3 and k=0.8 are satisfied, and Expression (19) is obtained.

$$fs'(n)=(1/0.8)\times(n-3)+3 \quad \text{Expression (19)}$$

For example, in the pixel number 3, fs'(3)=3.00 is satisfied, and the correction value C3 is 0.00 (=3.00−3.00). Further, in the pixel number 5, s'(5)=5.50 is satisfied, and the correction value C5 is +0.50 (=+5.50−5.00). The correction values C1 to C5 when the scanning positions are dense are illustrated in FIG. 11C.

Further, in FIG. 9B, n0=y0=3 and k=1.2 are satisfied, and Expression (20) is obtained.

$$fs'(n)=(1/1.2)\times(n-3)+3 \quad \text{Expression (20)}$$

For example, in the pixel number 3, fs'(3)=3.000 is satisfied, and the correction value C3 is 0.000 (=3.000−3.000). Further, in the pixel number 5, fs'(5)=4.667 is satisfied, and the correction value C5 is −0.333 (=4.667−5.000). The correction values C1 to C5 when the scanning positions are sparse are illustrated in FIG. 11D.

Further, even when a dense or sparse state and a shift are mixed in the scanning lines, an ideal scanning position after the coordinate transformation can be determined with use of Expression (15) or (16). The correction value setting portion 506 is configured to subject an ideal scanning position to the coordinate transformation based on a positional deviation amount to determine the correction value Cn, and output information on the correction value Cn to the filter coefficient setting portion 504.

(Filtering)

In the embodiment, the filtering is performed in order to generate correction data. In the embodiment, the filtering portion 501 performs the filtering through a convolution operation based on the following filter function. That is, the filtering portion 501 performs the filtering based on a positional relationship between the positions in the sub-scanning direction of pixels obtained by correcting scanning positions in the sub-scanning direction of pixels of the input image data, and the positions in the sub-scanning direction of pixels having an interval between scanning lines transformed uniformly by the coordinate transformation. A pixel before the filtering is also referred to as an input pixel, and a pixel after the filtering is also referred to as an output pixel. Further, a pixel before the filtering is a pixel subjected to the above-mentioned coordinate transformation.

Figure 10A:
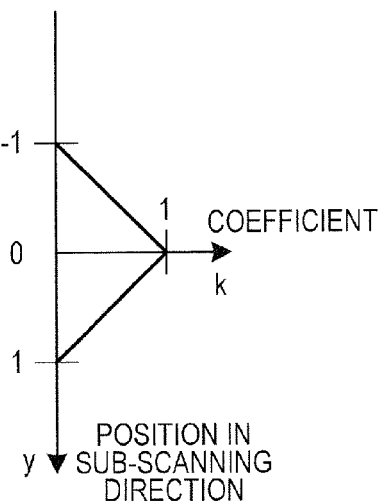
FIG. 10A, FIG. 10B, and FIG. 10C are each a graph for showing a convolution function to be used in filtering according to the embodiment.
Figure 10B:
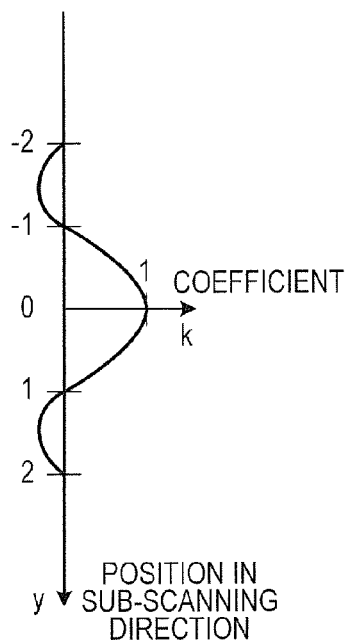
Figure 10C:
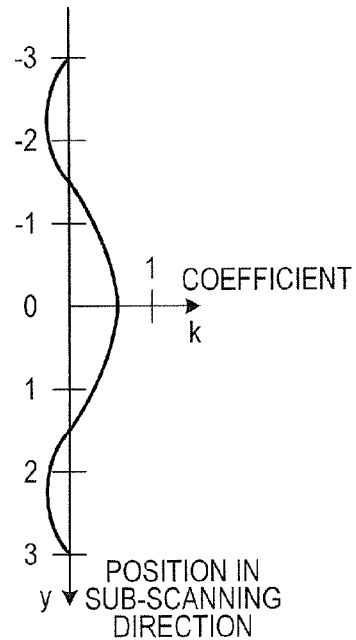

The convolution function according to the embodiment can be selected from linear interpolation illustrated in FIG. 10A, and bicubic interpolation illustrated in FIG. 10B and FIG. 10C. The filter function output portion 505 outputs information on the convolution function used in the filtering to the filter coefficient setting portion 504 as information of the table, for example. In FIG. 10A, FIG. 10B, and FIG. 10C, a vertical axis "y" represents a position in the sub-scanning direction, with a unit being a pixel, and a horizontal axis "k" represents a magnitude of a coefficient. Although the unit of the vertical axis "y" is set to a pixel, a line may be used as a unit because the sub-scanning direction is illustrated.

An expression of FIG. 10A is represented by Expression (21).

$$k = y + 1 \quad (-1 \le y \le 0)$$
$$k = -y + 1 \quad (0 < y \le 1) \quad \text{Expression (21)}$$
$$0 \quad (y < -1, y > 1)$$

Expressions of FIG. 10B and FIG. 10C are represented by the following two expressions.

$$\text{bicubic}(t) = \begin{cases} (a+2)|t|^3 - (a+3)|t|^2 + 1 & (|t| \le 1) \\ a|t|^3 - 5a|t|^2 + 8a|t| - 4a & (1 < |t| \le 2) \\ 0 & (2 < |t|) \end{cases} \quad \text{Expression (22)}$$

$$k = \text{bicubic}\left(\frac{y}{w}\right) / w \quad \text{Expression (23)}$$

In the embodiment, "a" is set to −1, and "w" is set to 1 in FIG. 10B and set to 1.5 in FIG. 10C, but "a" and may be adjusted in accordance with the electrophotographic characteristics of each image forming apparatus. The filter coefficient setting portion 504 is configured to output a coefficient ("k" described later) to be used in the filtering to the filtering portion 501 based on the information on the filter function obtained from the filter function output portion 505 and the information on the correction value C output from the correction value setting portion 506.

Figure 10D:
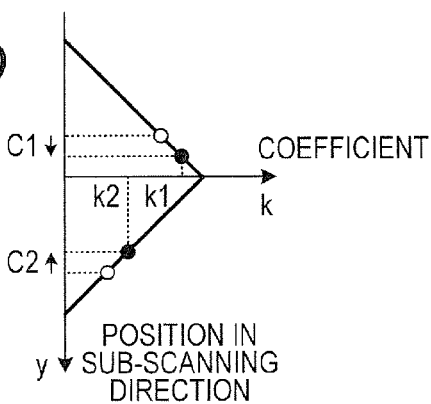
FIG. 10D is a graph for showing a correction value and a coefficient.

Now, description is given with reference to FIG. 10D. In FIG. 10D, the horizontal axis represents a coefficient "k" to be used in the filtering, and the vertical axis represents a position "y" in the sub-scanning direction. When the filtering portion 501 receives the correction value Cn from the correction value setting portion 506, the filtering portion 501 determines a coefficient "kn" corresponding to the correction value Cn with use of the filter function input from the filter function output portion 505. White circles of FIG. 10D represent coefficients before the coordinate transformation. In FIG. 10D, it is illustrated that coefficients k1 and k2 were set with respect to a correction value C1 and a correction value C2, respectively, as coefficients "kn" to be used in the filtering (black circles). In the embodiment, the same convolution function is applied irrespective of whether the input image data is dense or sparse, and sampling is performed at an ideal scanning position, to thereby store density per predetermined area of the input image data.

(Specific Example of Filtering)

A specific example of performing the filtering with use of the convolution operation with a filter function by linear interpolation of Expression (21) based on a coordinate position after the coordinate transformation of the embodiment will be described with reference to FIG. 11A, FIG. 11B, FIG. 11C, and FIG. 11D. The filtering using the convolution operation is performed by the filtering portion 501. FIG. 11A to FIG. 11D correspond to FIG. 6A to FIG. 6D. Each column on the left side of FIG. 11A to FIG. 11D represents input pixels after the above-mentioned coordinate transformation. Further, each column on the right side of FIG. 11A to FIG. 11D represents scanning positions on the photosensitive drum 102 after the above-mentioned coordinate transformation. That is, the scanning positions in each column on the right side of FIG. 11A to FIG. 11D have been subjected to the coordinate transformation so as to have a uniform interval and a distance of 1.

More specifically, the scanning positions in the sub-scanning direction of input pixels after the coordinate transformation are represented by a straight line (y'=fs'(n)) indicated by the alternate long and short dash line of the graph after the coordinate transformation illustrated on the right side of FIG. 7A, FIG. 7B, FIG. 9A, and FIG. 9B. The scanning positions on the photosensitive drum 102 after the coordinate transformation are represented by a straight line (y'=fs'(n)) indicated by the solid line of the graph after the coordinate transformation illustrated on the right side of FIG. 7A, FIG. 7B, FIG. 9A, and FIG. 9B. For example, in FIG. 7A, the shift amount is +0.2 (=S), and hence fs'(n)=y−0.2=n−0.2 is satisfied after the coordinate transformation.

Further, in FIG. 11A, FIG. 11B, FIG. 11C, and FIG. 11D, the magnitude of a pixel value, that is, a density value is represented by shading of circles. Further, numbers in parentheses indicate numbers of scanning lines, and are the same as the pixel numbers illustrated in FIG. 6A to FIG. 6D. In each graph at the center of FIG. 11A, FIG. 11B, FIG. 11C, and FIG. 11D, the horizontal axis represents density, and the vertical axis represents a position in the sub-scanning direction. The convolution operation involves developing waveforms W (W1 to W5 with respect to the pixels (1) to (5)) obtained by multiplying the filter function based on each coordinate position of an input pixel (FIG. 10A) by a pixel value, and adding the waveforms W by superimposing.

Figure 11A:
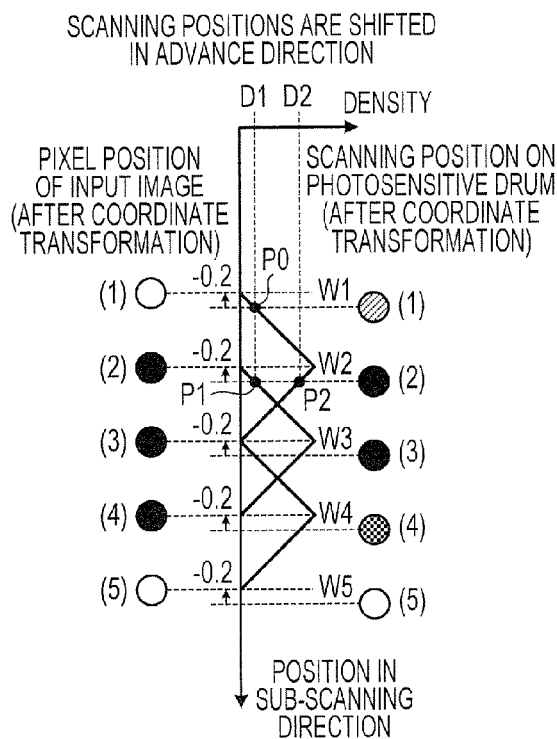
FIG. 11A, FIG. 11B, FIG. 11C, and FIG. 11D are each a diagram for illustrating the filtering for each classification of positional deviation according to the embodiment.

FIG. 11A will be described first. The pixels (1) and (5) represented by white circles have a density of 0, that is, a pixel value of 0. Therefore, W1 and W5 obtained by multiplying a filter function by a pixel value are both 0. The pixels (2), (3), and (4) represented by black circles have the same density, and the maximum values of the waveforms W2, W3, and W4 are the same. Thus, the pixels (2), (3), and (4) each result in a waveform obtained by developing the filter function based on the pixel position of the input pixel. The result of the convolution operation is a sum ($\Sigma Wn$, n=1 to 5) of all the waveforms.

Figure 11B:
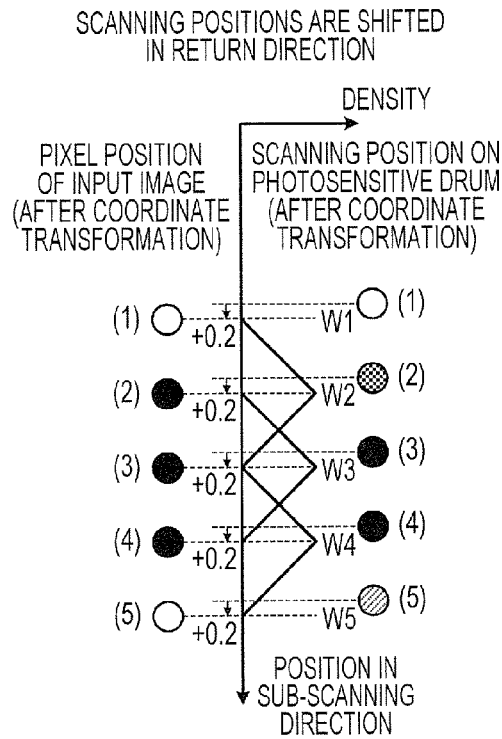
Figure 11C:
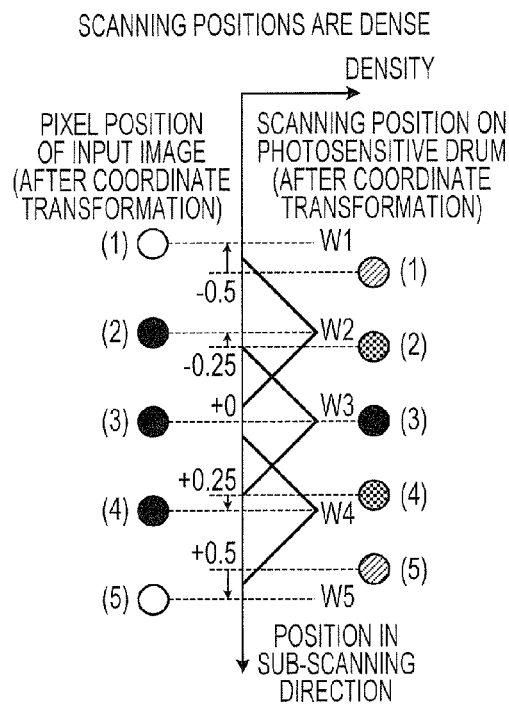
Figure 11D:
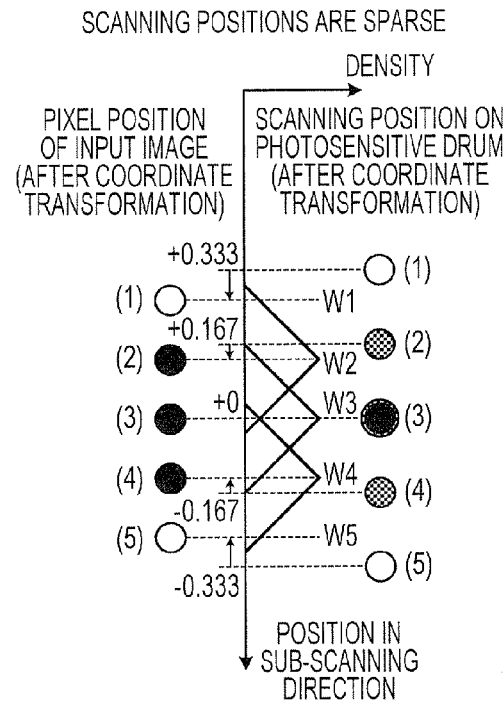

A pixel value of an output pixel is sampled at the scanning position on the photosensitive drum 102 after the scanning position is subjected to the coordinate transformation. Therefore, for example, the pixel value (1) corresponding to the scanning position on the photosensitive drum 102 intersects with the waveform W2 at a point P0, and hence is calculated to be density D1. Further, the pixel value (2) intersects with the waveform W2 at a point P2 and the waveform W3 at a point P1, respectively, and hence is calculated to be density D1+D2. The pixel values (3) to (5) are subsequently determined in a similar manner. The pixel value (5) does not intersect with any waveform, and hence the pixel value thereof is set to 0. Further, the result obtained by calculating the pixel values (1) to (5) of FIG. 11B to FIG. 11D are represented by shading of pixels in each column on the right side.

The positional deviation of the input pixels is illustrated so as to correspond to each pixel in the vertical axis of FIG. 11A to FIG. 11D. The positional deviation amount represented by the vertical axis of FIG. 11A to FIG. 11D is information on the positional deviation amount determined by an inverse function in accordance with the coordinate transformation of the scanning positions in the sub-scanning direction of the pixels of the input image. For example, in the case of FIG. 11A, as described with reference to FIG. 7A, the correction amount C of the positional deviation amount S of the scanning lines is −0.2. Further, for example, in the cases of FIG. 11C and FIG. 11D, the correction amounts C are calculated with use of Expressions (19) and (20), respectively.

FIG. 11A is an illustration of a state in which the scanning positions of the scanning lines are shifted in the advance direction in the sub-scanning direction, but the median points of the pixel values are shifted in the return direction, which is opposite to the advance direction, and hence the positions of the median points of the pixel values are corrected. FIG. 11B is an illustration of a state in which the scanning positions of the scanning lines are shifted in the return direction in the sub-scanning direction, but the median points of the pixel values are shifted in the advance direction, and hence the positions of the median points of the pixel values are corrected. FIG. 11C is the case in which the scanning positions are dense, and is an illustration of a state in which the distribution of density is widened due to the convolution operation after the coordinate transformation to cancel the local concentration of density, to thereby correct a local change in density. Further, FIG. 11D is the case in which the scanning positions are sparse, and is an illustration of a state in which the distribution of density is narrowed due to the convolution operation after the coordinate transformation to cancel the dispersion of density, to thereby correct a local change in density. In particular, the pixel value (3) of FIG. 11D is a density of (100+α)% that is higher than 100%.

(Filtering)

Figure 12:
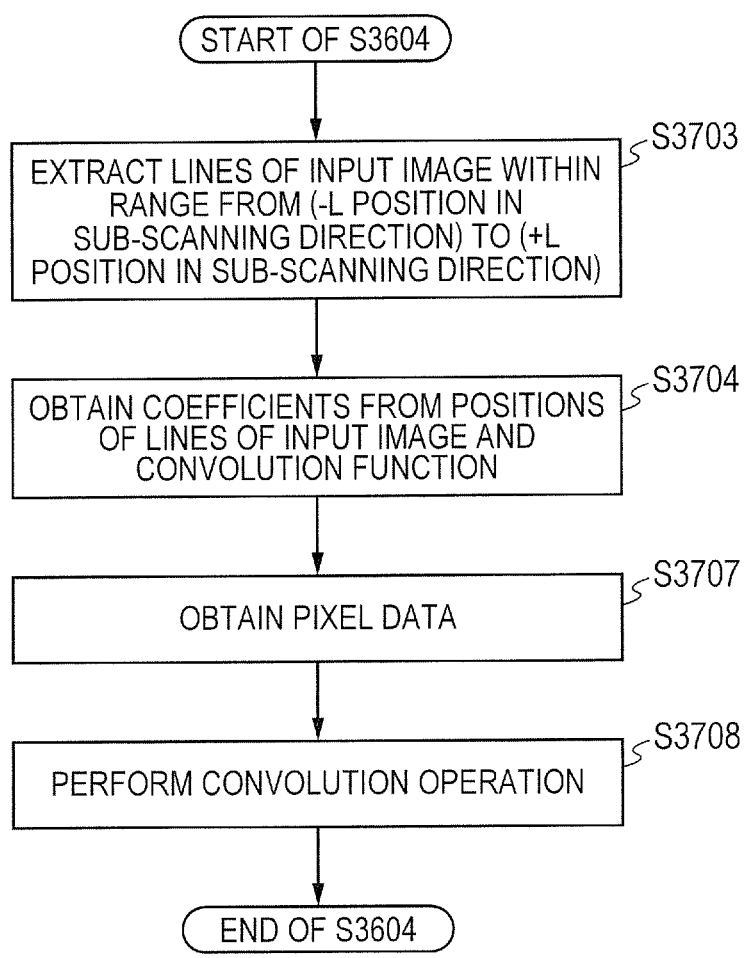
FIG. 12 is a flowchart for illustrating the filtering according to the embodiment.

Referring back to FIG. 5, in S3604 of FIG. 5, the CPU 303 performs the filtering with the filtering portion 501 based on the attribute information for correction generated in S3603. Specifically, the CPU 303 performs a convolution operation and re-sampling with respect to the above-mentioned input image. The processing of S3604 performed by the CPU 303 will be described below in detail with reference to the flowchart of FIG. 12.

When the CPU 303 starts the filtering through the convolution operation with the filtering portion 501, the CPU 303 performs the processing in S3703 and subsequent steps. In S3703, when the spread of the convolution function is defined as L, the CPU 303 extracts lines of an input image within a range of before and after ±L of the sub-scanning position of a line yn (position yn) of an output image of interest, that is, the range of a width of 2L (range of from (yn−L) to (yn+L)). In this case, L is defined as a minimum value at which the value of the convolution function becomes 0 outside of the range of from +L to −L of the convolution function. For example, in linear interpolation of FIG. 10A, L is equal to 1. In bicubic interpolation of FIG. 10B, L is equal to 2. In bicubic interpolation of FIG. 10C, L is equal to 3. The ymin and ymax within a range of from ymin to ymax of the corresponding input image satisfy the following condition with use of Expression (16).

$$ft^{-1}(y\min)=yn-L, ft^{-1}(y\max)=yn+L \qquad \text{Expression (24)}$$

When Expression (24) is modified, the ymin and ymax are determined by Expression (25).

$$y\min=ft(yn-Lm), y\max=ft(yn+L) \qquad \text{Expression (25)}$$

Thus, the lines of the input image to be extracted with respect to the line "yn" of the output image of interest are lines of all the integers within a range of from ymin to ymax.

When the line of the output image of interest is denoted by "yn", and the line of the input image to be subjected to the convolution operation is denoted by "ym", a distance "dnm" is represented by Expression (26).

$$dnm=yn-ft^{-1}(ym) \qquad \text{Expression (26)}$$

Thus, in S3704, the CPU 303 obtains a coefficient $k_{nm}$ as a convolution function g(y) with the filter coefficient setting portion 504 by Expression (27).

$$k_{nm}=g(dnm) \qquad \text{Expression (27)}$$

In S3707, the CPU 303 obtains pixel data on a position "n" in the sub-scanning direction in the input image extracted in S3703 and a position N of interest in the main scanning direction. The pixel data is defined as input pixel data $Pin_m$. In S3708, the CPU 303 performs the convolution operation with the filtering portion 501, and ends the processing. More specifically, the filtering portion 501 subjects the corresponding coefficient $k_{nm}$ determined in S3704 and the input pixel data $Pin_m$ obtained in S3707 to a product-sum operation, to thereby determine a value $Pout_n$ of the pixel of interest. The input pixel data $Pin_m$ is density of the pixel of interest before the filtering, and the value $Pout_n$ of the pixel of interest is output pixel data and is density of the pixel of interest after the filtering.

$$Pout_n = \sum_{m}^{all} k_{nm} \cdot Pin_m \qquad \text{Expression (28)}$$

Expression (28) corresponds to FIG. 11A to FIG. 11D. The darkness (density) of the circles on the left side in FIG. 11A to FIG. 11D corresponds to the input pixel data $Pin_m$. D1 and D2 in FIG. 11A correspond to $k_{nm} \times Pin_m$. The darkness (density) of the circles on the right side in FIG. 11A to FIG. 11D corresponds to $Pout_n$.

(Calculation of Position Information in Sub-Scanning Direction)

Figure 13:
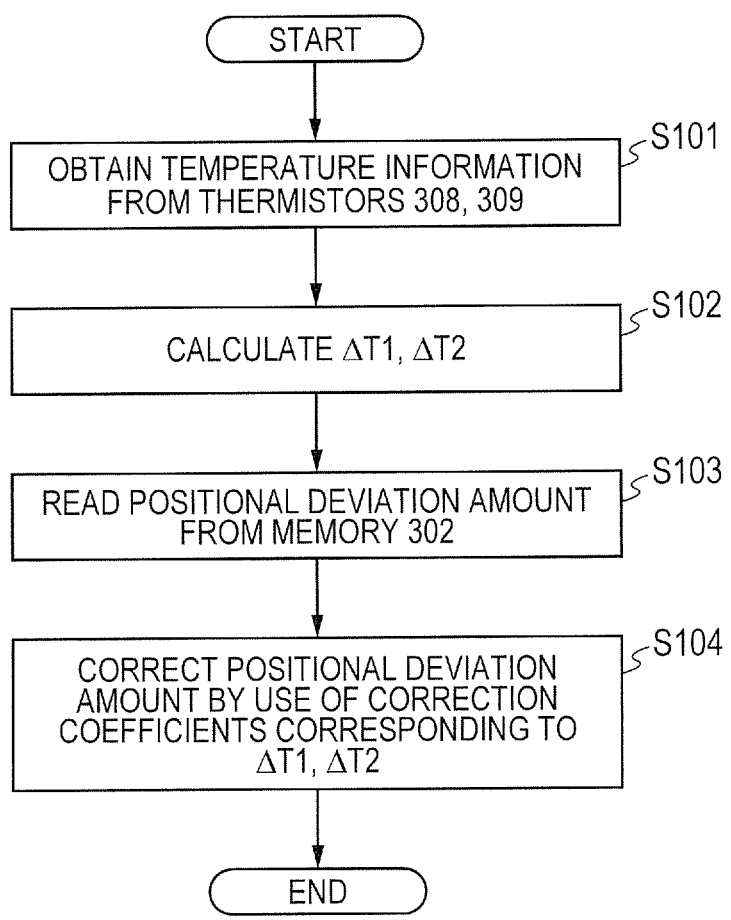
FIG. 13 is a flowchart for illustrating calculation processing of positional deviation information according to the embodiment.

FIG. 13 is a flowchart for illustrating a detailed control sequence of the processing of S3602 in which position information in the sub-scanning direction is calculated, which is described above with reference to FIG. 5. The CPU 303 executes the processing of FIG. 13 when the processing of S3602 of FIG. 5 starts. In S101, the CPU 303 reads temperature information from the thermistor 309 provided near the fθ lens 206 and the thermistor 308 provided near the laser light source 201, thereby obtaining a temperature T1 near the laser element and a temperature T2 near the lens. In S102, the CPU 303 calculates, by the following expressions (29) and (30), temperature change amounts ΔT1 and ΔT2 indicating how much the temperature T1 near the laser element and the temperature T2 near the lens, which are obtained in S101, have risen from a temperature T0 obtained through measurement of positional deviation amounts in the factory. In the embodiment, the following are assumed. Positional deviation is measured in the factory in a controlled environment in which the temperature near the laser element and the temperature near the lens are always a constant temperature of the temperature T0. Further, information on the temperature T0 that is a predetermined temperature is stored in the memory 302 in advance, and the CPU 303 reads the information in the processing of S102.

Temperature change amount ΔT1=temperature T1−temperature T0  Expression (29)

Temperature change amount ΔT2=temperature T2−temperature T0  Expression (30)

In S103, the CPU 303 reads the optical face tangle error amount and the mirror face eccentric amount of the corresponding mirror face out of the optical face tangle error amounts X1 to X5 and the mirror face eccentric amounts Y1 to Y5 stored in the memory 302. In S104, the CPU 303 reads correction coefficients K3 and K4 corresponding to the temperature change amounts ΔT1 and ΔT2 from FIG. 14A and FIG. 14B, respectively, based on the temperature change amount ΔT1 of the laser element and the temperature change amount ΔT2 of the lens, which are calculated in the processing of S102. FIG. 14A is a table including the temperature change amount ΔT1 of the laser element and the corresponding correction coefficient K3. The correction coefficient K3 is a correction coefficient corresponding to a change in temperature of the laser element, and is a ratio value to a shift amount of 1 mm of the conjugate point measured in the factory (first increase rate). Meanwhile, FIG. 14B is a table including the temperature change amount ΔT2 of the lens and the corresponding correction coefficient K4. The correction coefficient K4 is a correction coefficient corresponding to a change in temperature of the lens, and is a ratio value to a shift amount of 1 mm of the conjugate point measured in the factory (second increase rate). The tables of FIG. 14A and FIG. 14B are assumed to be stored in the memory 302 that is a second storage unit. It is assumed that the correction coefficients for the shift amounts of the conjugate point with respect to the changes in temperature of the laser element and the lens, which are shown in FIG. 14A and FIG. 14B, are created based on experimentally determined numerical values. In FIG. 14A and FIG. 14B, the correction coefficients K3 and K4 are shown for every 5° C. with the temperature change amounts of the laser element and the lens being from 0° C. to 30° C. In FIG. 14A and FIG. 14B, the temperature change amounts are shown for every 5° C., and temperature change amounts between, for example, 0° C. and 5° C., are determined by linearly interpolating the correction coefficients.

Then, the CPU 303 calculates the position information for the corresponding mirror face, that is, a positional deviation amount in the sub-scanning direction for each mirror face by the following expressions (31) to (35) based on the read correction coefficients K3 and K4 corresponding to the temperature change amounts, and the position data of the mirror face read in S103.

Position information for first mirror face=((K3 (ΔT1)+K4(ΔT2))×X1)+Y1  Expression (31)

Position information for second mirror face=((K3 (ΔT1)+K4(ΔT2))×X2)+Y2  Expression (32)

Position information for third mirror face=((K3 (ΔT1)+K4(ΔT2))×X3)+Y3  Expression (33)

Position information for fourth mirror face=((K3 (ΔT1)+K4(ΔT2))×X4)+Y4  Expression (34)

Position information for fifth mirror face=((K3 (ΔT1)+K4(ΔT2))×X5)+Y5  Expression (35)

The positional deviation amount in the sub-scanning direction in the embodiment is determined from (optical face tangle error amount (X1 to X5) of rotary polygon mirror 204)+(mirror face eccentric amount (Y1 to Y5)). As described above, only the positional deviation components (Y1 to Y5) due to the eccentricity of the mirror face occur at the conjugate point. As described above, however, a temperature in the light scanning device 104 rises to change the temperatures of the laser element and the lens, leading to a change in refractive index of the fθ lens 206, which is the condenser lens forming the optical face tangle error correction optical system. As a result, the conjugate point shifts in the positive direction of the z-direction, and hence the positional deviation amount changes (increases). To cope with this, the correction coefficients K3 and K4, which correspond to the temperature change amount ΔT1 near the laser element and the temperature change amount ΔT2 near the lens, are used to correct the positional deviation amount due to an optical face tangle error amount. In this way, positional deviation information in the sub-scanning direction, which corresponds to temperature change, is determined for each mirror face of the rotary polygon mirror 204.

As described above, the embodiment calculates, for each mirror face of the rotary polygon mirror, a positional deviation amount corresponding to temperature change in ambient temperature or due to a rise in temperature in the apparatus to correct uneven image density, thereby being capable of preventing uneven image density from occurring due to temperature change. In the configuration of the embodiment, the two thermistors 308 and 309 are used to detect a temperature in the apparatus assuming the case where the temperature changes abruptly due to a rise in temperature in the apparatus, and hence a uniform heat distribution in the light scanning device 104 is lost. The number of thermistors is not necessarily required to be two. For example, three or more thermistors may be used when the heat distribution greatly varies, or one thermistor may be used when the heat distribution is uniform. Further, when an image forming apparatus includes no thermistor as the temperature detector, a temperature in the apparatus may be detected by a simple method as described below. Specifically, a temperature in the apparatus may be estimated by a method of estimating a rise in temperature in the image forming apparatus from how many sheets are successively subjected to printing, based on rising temperature data indicating that the temperature in the apparatus rises every time the apparatus performs printing on one sheet. Further, the temperature change amount ΔT1 of a laser and the temperature change amount ΔT2 of a lens may be calculated based on the estimated temperature.

As described above, according to the embodiment, it is possible to achieve satisfactory image quality without uneven image density by correcting positional deviation for each mirror face of the rotary polygon mirror, which is caused by a rise in temperature in the apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-058663, filed Mar. 23, 2016, which is hereby incorporated by reference herein in its entirety.

What is claimed is:

1. An image forming apparatus, comprising:
a light source, which includes a plurality of light emitting points, and is configured to emit light beams based on an image data;
a photosensitive member configured to rotate in a rotation direction so that a latent image is formed on the photosensitive member with the light beams emitted from the light source;
a rotary polygon mirror, which is configured to rotate around a rotation axis, and has a plurality of mirror faces each configured to deflect the light beams emitted from the light source so that the photosensitive member is scanned with the light beams;
a detector configured to detect temperature;
a storage unit configured to store scan position error data for a scan position error corresponding to each of the plurality of mirror faces, wherein the scan position error data comprises a data based on a scan position in the rotation direction of the light beams deflected by each of the plurality of mirror faces; and
a correction unit configured to correct the scan position error data based on a temperature detection result of the detector to generate a correction data, and configured to correct the image data by using the correction data, in the rotation direction of the photosensitive member, of the light beams deflected by each of the plurality of mirror faces.

2. An image forming apparatus according to claim 1, wherein the scan position error data is obtained based on a first deviation amount, in the rotation direction of the photosensitive member, of the light beams deflected by each of the plurality of mirror faces, the first deviation amount being caused by an inclination of each of the plurality of mirror faces, and a second deviation amount, in the rotation direction of the photosensitive member, of the light beams deflected by each of the plurality of mirror faces, the second deviation amount being caused by an eccentricity, from the rotation axis of the rotary polygon mirror, of each of the plurality of mirror faces.

3. An image forming apparatus according to claim 2, further comprising a first storage unit configured to store information,
wherein the first storage unit stores information on the first deviation amount and information on the second deviation amount correspondingly to each of the plurality of mirror faces.

4. An image forming apparatus according to claim 2, wherein the first deviation amount increases as the temperature detected by the detector rises, and
wherein the second deviation amount is not changed as the temperature detected by the detector rises.

5. An image forming apparatus according to claim 4, further comprising:
a lens configured to form the latent image on the photosensitive member with the light beam deflected by the rotary polygon mirror; and
a second storage unit configured to store information,
wherein the second storage unit stores a first increase rate of the first deviation amount of the light source with respect to a rise in the temperature, and a second increase rate of the first deviation amount of the lens with respect to the rise in the temperature.

6. An image forming apparatus according to claim 5, wherein the first increase rate and the second increase rate are stored in the second storage unit depending on a change amount by which the temperature detected by the detector rises from a predetermined temperature.

7. An image forming apparatus according to claim 6, wherein the predetermined temperature comprises a temperature at a time when the first deviation amount is measured.

8. An image forming apparatus according to claim 7, wherein the correction unit obtains the scan position error data based on the second deviation amount and the first deviation amount corrected based on the first increase rate and the second increase rate, which depend on the change amount by which the temperature detected by the detector rises from the predetermined temperature.

9. An image forming apparatus according to claim 8, wherein the detector comprises a first detector and a second detector,
wherein the first detector is arranged in a vicinity of the light source, and
wherein the second detector is arranged in a vicinity of the lens.

10. An image forming apparatus according to claim 9, wherein the correction unit corrects the first deviation amount based on the first increase rate depending on a change amount by which a temperature detected by the first detector rises from the predetermined temperature, and the second increase rate depending on a change amount by which a temperature detected by the second detector rises from the predetermined temperature.

11. An image forming apparatus according to claim 8, wherein the correction unit transforms a position of a pixel of an input image through coordinate transformation that causes an interval between scanning lines on the photosensitive member to match with a predetermined interval, based on the scan position error data obtained by the correction unit, and to perform filtering of obtaining a pixel value of a pixel of an output image by performing a convolution operation on a pixel value of the pixel based on the position of the pixel of the input image after the coordinate transformation.

12. An image forming apparatus according to claim 11,
wherein the correction unit obtains the position of the pixel of the input image after the coordinate transformation with use of an inverse function $ft^{-1}(n)$ of a function $ft(n)$ by the following expression:

$$fs'(n)=ft'(ft^{-1}(fs(n)))$$

where:
- $fs(n)$ represents a function indicating a position of an n-th pixel in the rotation direction of the photosensitive member of the input image;
- $ft(n)$ represents a function indicating a position of the n-th pixel in the rotation direction of the photosensitive member of the output image;
- $fs'(n)$ represents a function indicating a position of the n-th pixel in the rotation direction of the photosensitive member of the input image after the coordinate transformation; and
- $ft'(n)$ represents a function indicating a position of the n-th pixel in the rotation direction of the photosensitive member of the output image after the coordinate transformation.

13. An image forming apparatus according to claim 12, wherein the correction unit obtains the position of the pixel of the input image after the coordinate transformation by the following expression when the function $fs(n)$ satisfies $fs(n)=n$ and the function $ft'(n)$ satisfies $ft'(n)=n$:

$$fs'(n)=ft^{-1}(n).$$

14. An image forming apparatus according to claim 11, wherein the correction unit performs the convolution operation with use of linear interpolation or bicubic interpolation.

15. An image forming apparatus according to claim 11,
wherein the pixel value comprises a density value, and
wherein a density value per predetermined area before and after performing the convolution operation is stored.

16. An image forming apparatus according to claim 11, wherein the correction unit defines, when a width in the rotation direction of the photosensitive member within a range excluding 0 of a convolution function to be used for the convolution operation is defined as 2L, a range of from ymin to ymax of the pixel of the input image corresponding to a range of the width of 2L with a position "yn" of a predetermined pixel of the output image being a center as the following expressions:

$$ymin=ft(yn-L); \text{ and}$$

$$ymax=ft(yn+L).$$

17. An image forming apparatus according to claim 11, wherein the predetermined interval is determined based on a resolution of image formation by the image forming apparatus.

* * * * *